United States Patent [19]
Comerford et al.

[11] Patent Number: 5,109,413
[45] Date of Patent: Apr. 28, 1992

[54] MANIPULATING RIGHTS-TO-EXECUTE IN CONNECTION WITH A SOFTWARE COPY PROTECTION MECHANISM

[75] Inventors: Liam D. Comerford, Carmel; Steve R. White, New York, both of N.Y.

[73] Assignee: International Business Machines Corporation, Armonk, N.Y.

[21] Appl. No.: 441,221

[22] Filed: Nov. 28, 1989

Related U.S. Application Data

[63] Continuation of Ser. No. 927,299, Nov. 5, 1986, abandoned.

[51] Int. Cl.$^5$ .............................................. H04L 9/00
[52] U.S. Cl. ............................................................ 380/4
[58] Field of Search ...................... 380/4; 364/200, 900

[56] References Cited

U.S. PATENT DOCUMENTS

| | | | |
|---|---|---|---|
| 3,798,359 | 3/1974 | Feistel | 178/22 |
| 3,958,081 | 5/1976 | Ehrsam et al. | 178/22 |
| 3,996,449 | 12/1976 | Attanasio et al. | 235/61.7 R |
| 4,104,721 | 8/1978 | Markstein et al. | 364/200 |
| 4,120,030 | 10/1978 | Johnstone | 364/200 |
| 4,168,396 | 9/1979 | Best | 178/22 |
| 4,183,085 | 1/1980 | Roberts et al. | 364/200 |
| 4,238,854 | 12/1980 | Ehrsam et al. | 375/2 |
| 4,246,638 | 1/1981 | Thomas | 364/200 |
| 4,278,837 | 7/1981 | Best | 178/22.09 |
| 4,433,207 | 2/1984 | Best | 178/22 |
| 4,446,519 | 5/1984 | Thomas | 364/300 |
| 4,458,315 | 7/1984 | Uchenick | 364/200 |
| 4,465,901 | 8/1984 | Best | 178/22.08 |
| 4,471,163 | 9/1984 | Donald et al. | 178/22.08 |
| 4,471,216 | 9/1984 | Herve | 235/380 |
| 4,558,176 | 12/1985 | Arnold et al. | 364/900 |
| 4,562,306 | 12/1985 | Chou et al. | 178/22.08 |
| 4,599,489 | 7/1986 | Cargile | 178/22.08 |
| 4,609,777 | 9/1986 | Cargile | 178/22.08 |
| 4,621,321 | 11/1986 | Boebert et al. | 364/200 |
| 4,633,388 | 12/1986 | Chiu | 364/200 |
| 4,644,493 | 2/1987 | Chandra et al. | 364/900 |
| 4,646,234 | 2/1987 | Tolman et al. | 364/200 |
| 4,652,990 | 3/1987 | Pailen et al. | 364/200 |
| 4,796,181 | 1/1989 | Wiedemer | 380/4 |
| 5,034,980 | 7/1991 | Kubota | 380/4 |
| 5,047,928 | 9/1991 | Wiedemer | 380/4 |
| 5,052,040 | 9/1991 | Preston et al. | 380/4 |

FOREIGN PATENT DOCUMENTS 2124808  2/1984  United Kingdom .

OTHER PUBLICATIONS

Best, "Preventing Software Piracy with Crypto-Microprocessors", IEEE, 1980.
Everett, "Padlock", Computer Bulletin, Mar. 1985, pp. 16 et seq/"Software Protection", Open Computer Security.
Herzberg, "Public Protection of Software", Lecture Notes in Computer Science, vol. 218, 1986, pp. 158 et seq.
Kent, "Protecting Externally Supplied Software in Small Computers", Ph.D. Thesis, M.I.T., 1980.
Lipson, "Little Black Box 'Blocks' Illicit Software Copying", Stamford Advocate (Sep. 14, 1986), pp. E1 and E2.
Maude, "Hardware Protection Against Software Piracy", The Communications of the ACM, Sep. 1984, vol. 27, No. 9, pp. 950 et seq.
Purdy, "A Software Protection Scheme", IEEE 1982.
ROI
Simmons, "How to (Selectively) Broadcast a Secret", IEEE 1985.

*Primary Examiner*—Thomas H. Tarcza
*Assistant Examiner*—David Cain
*Attorney, Agent, or Firm*—Pollock, Vande Sande & Priddy

[57] ABSTRACT

A software asset protection mechanism segregates the right to execute software from the software itself. The rights to execute, when installed on a composite computing system, are stored in a coprocessor element of the composite computing system. The software asset protection mechanism is enhanced as described herein by providing for the manipulation of those rights to execute. More particularly, the rights to execute can be conditioned at least in terms of a valid period of execution at least in terms of a valid period of execution or a valid number of executions. The rights to execute can be safely transferred from one coprocessor to another, or can be returned to the software vendor. Finally, a method of backing up the rights to execute to provide the user with the rights to execute in case the coprocessor element of the composite computing system fails.

43 Claims, 19 Drawing Sheets

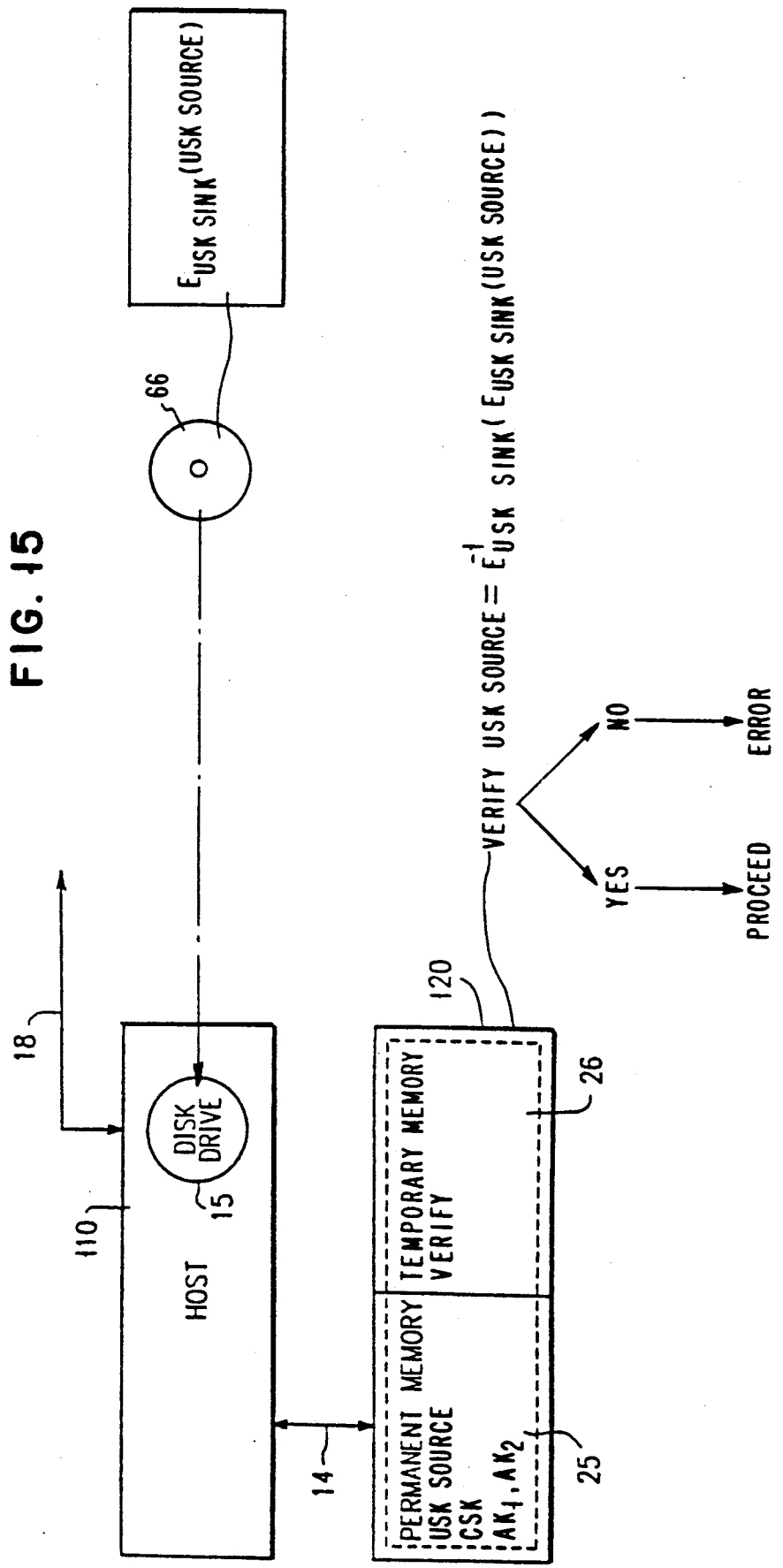

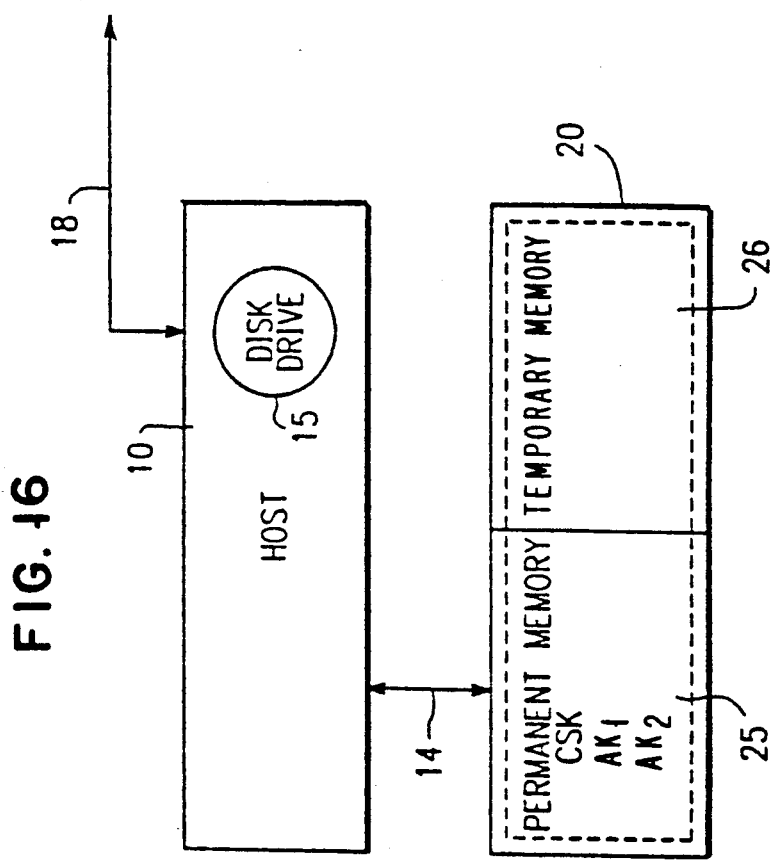

FIG.19

| BINARY FLAGS | | | | | MULTI-BYTE ENTRIES | | |
|---|---|---|---|---|---|---|---|
| META | CONDITION | ERASE | TRANSFER | BACKUP | CONDITION | LOCATION AND VERIFICATION INFORMATION | KEY |
| 0 | 0 | 0 | 0 | 0 | — | | CSK 1 |
| 0 | 0 | 0 | 0 | 0 | — | | CSK 2 |
| ⋮ | | | | | | | ⋮ |
| 0 | 0 | 0 | 0 | 0 | — | | CSK N |
| 0 | 0 | 1 | 0 | 1 | — | | AK 1 |
| 0 | 0 | 0 | 1 | 1 | — | | AK 2 |
| 0 | 1 | 1 | 1 | 0 | DATA | | AK 3 |
| ⋮ | | | | | | | ⋮ |
| 0 | 1 | 1 | 1 | 0 | DATA | | AK N |
| 1 | 0 | 1 | 1 | 1 | — | | MAK 1 |
| 1 | 0 | 1 | 1 | 1 | — | | MAK 2 |

MANIPULATING RIGHTS-TO-EXECUTE IN CONNECTION WITH A SOFTWARE COPY PROTECTION MECHANISM

This is a continuation of copending application Ser. No. 06/927,299 filed on Nov. 5, 1986 abandoned.

DESCRIPTION

Technical Field

The invention is in the field of data processing, especially in connection with a software copy protection mechanism. That mechanism restricts software, distributed on a magnetic disk or other medium, for use on any computer which is associated with an authorized, physically secure coprocessor where the mechanism does not interfere with the user creation of n"backup" copies, but the protection is not compromised by any such "backup" copies. The present invention is particularly directed at manipulating a right-to-execute which is a distinguishing characteristic of that copy protection mechanism.

CROSS-REFERENCE TO COPENDING APPLICATIONS

Reference is made to the following copending applications, assigned to the assignee of this application:

U.S. patent application Ser. No. 927,309, filed Nov. 5, 1986; U.S. patent application Ser. No. 927,306, filed Nov. 5, 1986; U.S. patent application Ser. No. 927,629, filed Nov. 5, 1986; U.S. patent application Ser. No. 927,298, filed Nov. 5, 1986; U.S. patent application Ser. No. 927,286, filed Nov. 5, 1986; and U.S. patent application Ser. No. 927,297, filed Nov. 5, 1986.

BACKGROUND OF THE INVENTION

The basic copy protection mechanism is described in copending application Ser. No. 927,629; this mechanism separates the software which is to be protected from the right to execute that software. To provide security and implement the mechanism, each computer on which a protected application is to run (hereinafter referred to as a host) is associated with a logically and physically secure coprocessor. When installed in the coprocessor, the right-to-execute a particular protected application exists in the form of a software decryption key called an application key (AK). So long as the software decryption key AK is retained in the permanent memory of the coprocessor, the corresponding protected software can be executed on the composite system including the host and coprocessor. The software copy protection mechanism has the advantage that it negligibly interferes with present and contemplated software distribution techniques, it allows the user to make unlimited numbers of "backup" copies and it does not require any two-way communication between the user and the software vendor. This is supported by distribution of an authorization to the coprocessor to accept a right to execute provided in the form of a hardware cartridge (or token). Furthermore, the user need only employ the token the first time the protected application is run in order to transfer the right to execute, which is represented by the unused token, to the coprocessor. Thereafter, the token may be discarded and it is thereafter totally unnecessary to maintenance or use of the right to execute.

The invention described in copending application Ser. No. 927,629 does not address manipulation of the right to execute (other than describing how a user may first acquire it), nor does it describe the possibility of conditioning the right to execute. The present invention is particularly directed at conditioning or manipulating or transferring the right to execute which exists in a coprocessor.

In particular, the present invention provides the capability of safely transferring the right to execute. The right to execute may be transferred to another coprocessor or may be merely transferred outside the coprocessor for external storage. In either event it is essential that the process of transferring the right to execute not generate or allow spurious or duplicate rights to execute which would of course defeat the purpose of the copy protection mechanism. As described herein, the transfer of a right to execute can be indirect, through the use of a transfer set (which in many respects is identical to the distribution set through which the right to execute was acquired) or direct via a coprocessor to coprocessor communication link. Safety is maintained even though the communication is unsecured in the sense that the transfer transaction may be observed.

The present invention also provides techniques for conditioning the right to execute. For example, the right to execute might be conditioned by a time period (a right to execute which exists up until a cut-off date and/or time) or it could be conditioned based on the number of times it is invoked (for example the vendor could sell a user the right to execute the protected application ten times). As will be described, the right to execute can be conditioned on any other parameter so long as it can be measured by the coprocessor to the satisfaction of the source of that right to execute (the software vendor). The availability of conditioned rights to execute provides the software vendor with additional flexibility and it further opens up the possibility, for the first time in the software field, of a truly safe "return" policy. For obvious reasons, a software vendor, using today's software distribution techniques, will be in jeopardy of giving his products away free if he accepts the "return" of software for full purchase credit. The vendor has no way of verifying with present distribution techniques whether or not the user has already duplicated the software so that after the return the user could still maintain a fully usable copy of the application. Using the principles described herein, however, the software vendor can implement a "return" policy and be assured that if a user returns the software, the user no longer retains an executable copy.

Because the software copy protection mechanism operates in the real world, with real world devices, and because the distinct right to execute exists in the form of a cryptographic key stored in the permanent memory of a coprocessor, it is necessary to address the possibility that the coprocessor storing the right to execute may fail. Such failure should not result in the complete loss of the user's rights to execute, and the present invention provides apparatus and methods for securing the user against the loss of the right to execute in the event his coprocessor does fail. Much as in the case with moving or transferring the right to execute, any hardware "backup" technique (available in case a coprocessor fails) should not have the property of being useful to generate spurious rights to execute. The hardware backup method provides minimal opportunity (and significant disincentive) for improperly multiplying rights to execute.

SUMMARY OF THE INVENTION

The invention meets these and other objects as described below.

Conditioned Right-to-Execute

In order to condition the right to execute, in a system such as described in our copending application Ser. No. 927,629, there must be:

1) a statement of the condition (or conditions) under which the application software may (or may not) be allowed to execute fully, and 2) some objective criteria against which the condition or conditions can be measured, and 3) a software program which can test the conditions against the criteria and act in a way determined by results of that test.

These objectives must be met in a way which is secure against attempts of the user, or anyone else not specifically authorized by the software vendor, to either vary the conditions or the objective criteria under which the conditions are met. In accordance with the invention, the criteria are stated in software, and more particularly, in the protected or encrypted portion of the application software. As is described in our copending application Ser. No. 927,629, the only form in which application software is available to the user is in encrypted form; because the user does not have access to the decryption key as a data object, he is unable to modify, or even read the protected software. Thus, incorporating the conditions of the right to execute within the protected software results in securing these conditions against alteration by the user or anyone else unless authorized by the software vendor. In order to save (for testing) the conditions which are tested against the programmed criteria, we use some storage space in the non volatile memory of the coprocessor; this storage space has already allocated to it the function of storing the decryption key necessary to decrypt the encrypted software. Thus the storage space allocated to a particular protected piece of software is expanded to include the condition which can be measured against the criteria. Because of the non-volatility of the memory, so long as the right to execute is available in the coprocessor, the objective conditions are also available. It should be understood that the coprocessor contains a continuously powered real-time clock within its physically secure boundary so that in the case that criteria involving time are to be used, the time information is available. Because the information is stored in a coprocessor's non-volatile memory, and only the portion of this memory allocated to any particular application can be accessed by that application, the information is secure against any attempt at modification by the user. The application software may modify the conditions stored in its portion of non-volatile memory, but may not change the value of the real-time clock.

For example, the software thus could count the number of times or the total period it had been used by changing numbers kept in this storage and executing only until criteria related to number or total period of executions were no longer met by the stored conditions.

As an example, assume that the software vendor has transferred to the user the right to execute on the condition that a certain terminal date had not passed, (i.e. the user has the right to execute the protected application up to, but not after Mar. 1, 1987). The coprocessor's operating instructions necessarily, therefore, provide for storage of a last allowed use (terminal) date along with the software decryption key. Since the coprocessor maintains a real time clock, whenever the decryption key is accessed or at intervals during application execution, the terminal date and the current date are available. The terminal date provision is protected against unauthorized alteration by the security of the coprocessor as is the real time clock setting. The encrypted portion of the software (the protected portion) describes the criterium that execution is not available beyond the terminal date. Whenever the protected software is run, the decryption key and the terminal date are accessed from the coprocessor's non-volatile memory. The criterion tested in the protected software requires that the terminal date be compared to the current date; if the current date is beyond the terminal date, then execution of the protected software does not proceed. The protected software can also be arranged to provide for deleting the particular software decryption key in the event that the current date is beyond the terminal date. It should be apparent to those skilled in the art that another condition which can be substituted for the terminal date condition is the number of times the software is executed. For this case, the protected software describes the number of executions which have been authorized, and in lieu of storing the current date along with the software decryption key, a count of allowed uses is stored which is decremented each time the software is executed. The protected portion then tests the allowed number of executions against the criterion that the number is greater than zero. It then either decrements the number or, if the number of authorized executions is zero, denies the user's request to execute the software (and perhaps the software decryption key is also deleted). It should be apparent that there are many variations to these specific implementations, including elapsed time, passwords, and combinations of these and other measurables, all of which are within the scope of the invention.

Transfer of Right-to-Execute

Transferring the right to execute from one user to another (or more particularly, from a source coprocessor to a sink coprocessor) can be accomplished by reconstructing a distribution set. This procedure returns the right to execute to a portable form which is substantially identical to that from which it was acquired in the first place, see copending application Ser. No. 927,629. This procedure, necessarily, removes the right to execute from the source coprocessor.

This transaction requires that the user obtain either a token or a disk and a token pair (also referred to as a Transfer Set), depending on the structure of the token. These sets can be provided by the hardware vendor. The token (or cartridge) in the set is loaded by the coprocessor hardware manufacturer. The Transfer Set, prior to manipulation by the user has a single piece of information, token data, stored in two forms. The token is loaded, by the hardware vendor with clear text token data; the physical characteristics of the token protect this sensitive information from unauthorized persons. The same data is encrypted under a hardware manufacturer secret key called a Common Supervisor Key (CSK) to generate $E_{CSK}$(token data). It is stored either on the disk of the Transfer Set, or in the token if it is so structured as to allow it. Because $E_{CSK}$(token data) is encrypted, it may be stored on the disk even though in that form it can be read and even copied by anyone. It is necessary that the transfer set be prepared by a trusted source, such as a hardware vendor, because if the token contents are known, other tokens could be loaded with known contents and the transferred right to execute replicated. Assuming that the user has acquired a suitable transfer set, the distribution set is prepared using a Reconstruct Distribution Set (RDS) process, by the user and his composite computing system, for example, as follows.

A utility program, running on the host computer, signals the (source) coprocessor that an RDS sequence is about to begin. The utility program identifies to the coprocessor the location of the key to be transferred. The coprocessor executes a CBS (Create Backup Set) procedure on all allowed keys except the indexed key. The CBS procedure is described below. At this point it is sufficient to note that the CBS procedure invalidates any existing hardware backup mechanism. The coprocessor requests and receives a copy of the encrypted token descriptor $E_{CSK}$(token data) from the transfer set. The coprocessor decrypts the token descriptor to provide clear text token data. This clear text token data is then encrypted using the software decryption key identified by the index to produce $E_{AK}$(token data). The coprocessor then stores this encrypted token descriptor $E_{AK}$(token data) in a reserved non-volatile storage area of the token or on the disk and either erases or otherwise de-activates the software decryption key AK at the given storage location. The coprocessor then passes the encrypted token descriptor to the host for storage on the transfer set disk. As will be described later, the key (AK) to be transferred may be associated with conditions of execution. If these conditions of execution are unchanging (such as terminal date) then the encrypted application key may be copied to the transfer set disk. If the conditions of execution are changing (such as remaining hours of use or remaining number of uses), then the encrypted file containing the application key and the conditions of execution cannot be copied from the distribution disk without resetting the conditions. This synchronization of a token descriptor file and an application key file can be achieved by including a correspondence test number in each file. The next step in transfer is thus the preparation of an encrypted application key file for storage on the transfer disk. This preparation is identical to the encrypt vendor key (EVK) transaction described below save that the correspondence test number is substituted for the random number. This correspondence number could be a fraction of the token data. After this preparation and transfer, the utility program, running in the host, then transfers to the transfer set disk the two files containing the plain text and cipher text parts of the protected program. The reader can now verify that the distribution set is identical to the distribution set described in application Ser. No. 927,629 in that it includes the encrypted token data, encrypted with the software decryption key AK, the plain text file and the protected or encrypted software file, also encrypted under the software decryption key AK, as well as the software decryption key AK encrypted by the hardware vendor's key CSK. The latter three elements may be copied from the original distribution disk or any backup copy of those files if permitted by execution conditions. It should be self-evident that since the distribution set is now identical in all but one respect, it is usable with any coprocessor to transfer the right to execute the particular encrypted software file. The only difference between the distribution set and the original set from which the right to execute was acquired, is that the token data is very likely to be different; this is immaterial as long as both portions of the set (the token cartridge and the diskette) have been derived from identical token data. The (source) coprocessor now deletes the decryption key AK from its temporary memory. At this point, the right to execute has been deleted from the source coprocessor and exists solely in the Transfer Set.

Transfer of the right to execute, however, need not be indirect, e.g. through the transfer set already referred to. Transfer of the right to execute can be direct, e.g. using a coprocessor to coprocessor communication link. Furthermore, the coprocessor to coprocessor communication link need not be secure in order to maintain the safety of the right to execute being transferred; rather the safety is cryptographically secured as will now be described. In the following discussion we will refer to a transfer from coprocessor to coprocessor, however, the reader should understand that the communication link between coprocessors can either be through direct connection, or can be through any bidirectional data communication system. A transfer of a right to execute from one coprocessor to another is considered safe when the two coprocessors involved are able to identify one another as "members of the family" and generate a one time only Session Key for their use in that transaction. The identification as members of the family is needed for assurance that the procedures used by each will mesh correctly, so that proliferation of rights to execute will not occur, and so that other protected information will not be revealed.

The transaction in which the Session Key is generated relies on the presence of information in high privilege memory which is common to the two coprocessor systems participating in the transaction and on the ability of coprocessors to generate good random numbers. The process which generates a Session Key will result in both coprocessors involved in the transaction possessing the same key only if both coprocessors have the necessary antecedent information in common.

The transaction for mutual identification and generation of a Session Key is as follows. For purposes of this description we will refer to the user or the user's composite computing system or the user's coprocessor as the source user, source composite computing system or source coprocessor if the right to execute is being transferred from that user, composite computing system or coprocessor. We will refer to the user, composite computing system or coprocessor as the sink user, sink composite computing system or sink coprocessor if the right to execute is being transferred thereto. The source user signals the source coprocessor that a Session Key is needed. The source coprocessor generates a random number which will be used in generating the session key, pads it with another random string of bits, and appends a Message Authentication Code (MAC). The MAC can be used to ensure that the plain text message which is recovered on decryption is identical to the one transmitted. The source coprocessor then encrypts the number with a key CSK and sends the encrypted number to the sink coprocessor. The sink coprocessor has performed the same function and has sent its random encrypted number to the source coprocessor. The source coprocessor decrypts the number received under the encryption key (CSK). In the event that each coprocessor stores multiple CSKs, then each coprocessor decrypts the received number under each CSK in succession until either a valid MAC is obtained, or the collection of supervisor keys (CSK) is exhausted. If a valid MAC is not found, then an error message is returned. This will be the typical outcome if a processor which is not a "member of the family" tries to pass itself off as one. If a valid MAC is obtained, then the random numbers generated in the two coprocessors are combined in both coprocessors and are used as the Session Key. Of course, part of the operating instructions for the coprocessors will define, a priori, the particular manner in which the random numbers are to be combined in order to generate the Session Key; one number could be concatenated with another; the numbers could be EXCLUSIVE-OR'ed, etc.

In order to avoid the procedure which may require successive decryptions in a search for the "correct" supervisor key, location information such as an index for the supervisor key which had been used could be sent along with the encrypted number. There is an advantage, however, to the technique which requires coprocessors to "search" for the correct supervisor key. A procedure which transmits an index number along with the encrypted number provides a growing collection of information about the supervisor keys to any observer.

Once the Session Key has been generated, it is possible for the coprocessors to transfer rights to execute by encrypting them under the Session Key. The coprocessors' firmware, controlling the procedure, ensures that the rights are erased from the source processor. The right to execute could be erased when transmitted by the source processor, although a preferable technique is to erase the right to execute (the software key) only when the sink coprocessor indicates that the right to execute has been safely received and to activate the right to execute only when the source coprocessor indicates the right to execute has been deactivated. The right to execute, which is transferred in encrypted form, is secured against an observer by its encryption and there is no need to employ a secure communication link or channel.

Direct or inter-coprocessor communication is the method of choice for movement of rights to execute in a network or a mainframe link environment. In these cases or others involving placing more than one right to a particular application in a particular coprocessor, a count of the rights for a given package is maintained in the key storage area of the source coprocessor so that the number of rights which have been received limits the number which are distributed.

It should be clear from the above descriptions that it is within the realm of this mechanism to associate with an AK a description of the life span of an AK in several dimensions (time, numbers of use, etc.). It should also be clear that it is within the capacity of this mechanism to divide or parcel out this span under control of software provided by the software vendor and executed by a coprocessor. Libraries of software could be maintained in distributed computing systems by these means without violating the conservation of rights to execute while providing benefit to the distributed computing system's user.

In the event that a transfer of multiple rights to execute is required, the coprocessor to coprocessor transfer proceeds as follows once a Session Key has been created. The source user identifies to the source coprocessor those rights to execute (AKs) to be transferred. The source coprocessor executes a CBS procedure (defined hereinafter) in order to update any backup set of rights to execute. The source coprocessor then encrypts the software keys under the Session Key and stores them with the Session Key in a reserved location of temporary memory. The source coprocessor marks each software key from the key store (permanent memory) as inactive and sends the encrypted information to the sink coprocessor. The sink coprocessor receives the collection of encrypted keys from the source coprocessor, and decrypts them under the Session Key. The sink coprocessor then stores the decrypted keys in its key store (permanent memory) marking them inactive and sends its host computer location information by which the applications can access the keys in the load decrypt run procedure. The files actually comprising the protected software can be sent by any conventional (unprotected) technique or apparatus. The sink coprocessor can return a message to the source coprocessor indicating receipt of the particular software key or keys to induce the source coprocessor to eliminate those software keys from its temporary memory. When the source coprocessor confirms the removal, the keys are then activated by the sink coprocessor.

It should be noted that a software vendor may not wish to allow transfer of a right to execute and that this constitutes a term or condition of sale. Conditions which control the allowed movement of rights to execute can be stored in association with an AK as part of the procedure in which it is acquired. If a manipulation of an AK is requested by a user, then these conditions (flags) are tested against go/no-go criteria stored in the coprocessor firmware which implements the requested manipulation.

Backup of Right-to-Execute

The backup procedure to be described is one which is intended to insure that the collection of rights to execute stored in a user's coprocessor are not lost due to an unforeseen failure of, for example, the supply of power to the coprocessor's non-volatile memory. This is to be distinguished from backup procedures which are applied to files of data and software. The latter procedures are entirely conventional, well understood, and are applicable to those kinds of objects, where they exist, in this system (plain text and encrypted software and encrypted application key). Many functional copies of such objects may be kept for use by any authorized system, thus ensuring against their loss. It is, rather, the objective of the backup procedure described below to back up rights to execute so that they are not lost but so that many functional copies of that kind of object cannot be made.

Because the backup procedure is designed to circumvent the results of an unforeseen failure in the coprocessor, the backup procedure must create, external to the coprocessor, sufficient information so that the right to execute can be installed entirely independently of the (source) processor which stores an entirely valid right to execute. Because of this necessary independence, the backup procedure itself is a potential source of a (duplicate or spurious) right to execute. Allowing the creation of backup rights is a policy decision for the software vendor. It is a potential detriment to his security and would be provided for his customers' convenience. As noted earlier with respect to transfers of rights, a provider of software may not wish to allow backup. This condition of sale is enforceable by the same mechanism as described for control of transfer given the existence of a no-backup flag associated with an AK. This option is desirable in the case that the conditions of execution may change. To minimize the impact of backup rights, they are, in this system, made conditional in that they expire after a conveniently short interval which is long enough for the user who has actually had a failure in his coprocessor to have that failure verified, for example by the hardware manufacturer. Assuming the hardware manufacturer verifies the failure of the user's coprocessor, the means are provided to the user to carry out an additional procedure to remove the condition on the backup rights. In order to safely integrate the creation of backup rights with the other capabilities described herein, the creation of backup rights should be thought of as beginning a transfer of all allowed rights which is then left pending completion. Transfer procedures are necessarily interrelated with the backup procedures so that any user backup set (which carries a potential right to execute) is invalidated at the time any complete transfer is effected. This prevents the transferred rights from also being present in a valid backup. Accordingly, the user has the following options in connection with the procedures described herein:

1. With his right to execute installed on a coprocessor, the user can have a backup set (representing a collection of potential rights to execute) which can be converted into an actual, but conditioned, right to execute, or 2. The user can remove one or more rights to execute from his coprocessor and install them in a transfer set or directly transfer them to another coprocessor, but that procedure requires invalidation of the existing backup set. This requirement is entirely consistent with the user's rights since when rights to execute are removed from a coprocessor, there is no need for the rights to be represented in the backup set. Obviously, a new backup set which correctly reflects the diminished set of installed rights to execute may be prepared immediately after a transfer.

The procedures arranged for creating backup rights are comprehensive in that a single backup set can retain potential rights to execute for multiple applications. The procedures contemplate that the user's collection of rights on execute may be dynamic, e.g. his collection of rights on one day may be greater or less than his collection of rights on another day. This necessarily requires that the backup rights be dynamic too and track changes in the user's collection of rights to execute.

Basically, the backup procedure is a two-step process, in a first step a Backup Set is created (Create Backup Set, or CBS); the Backup Set includes a disk on which an encrypted file of rights to execute (for a group of applications) is stored. A supervision key which is unique to this (source) processor (USK) is also included in this file. This information will allow the hardware manufacturer to verify that the failed processor which they receive as evidence of the failure is the processor claimed to have contained these rights. A token which can validate this collection to a coprocessor is also part of the set. The key used to encrypt this file is a random number generated by the coprocessor, possibly by encrypting the date and time with a unique supervisor key (USK). It is the authorization to use this random number (RK) key which is validated by the backup set token. As noted above, the Backup Set is considered a pending transfer.

The second step in the backup process is Install Backup Set (IBS); in this step the potential right(s) to execute represented by the backup set, consisting of the token and disk, is installed on a coprocessor. Because it is contemplated that the user is likely to execute the CBS step of the backup procedure on plural occasions before ever executing the IBS step, the token which is employed in the Backup Set must be more capable than the token used in the Distribution Set; this capability is required because of the fact that the user may execute the CBS step each time a new application is acquired. The user's existing backup must be invalidated at that time to prevent the creation of additional rights to execute. Accordingly, the token data will typically be much longer than the token data used in a Distribution Set so that a portion of that token can be read as part of each CBS transaction, changing the token content as a consequence, and invalidating previous backup disk files, without in the process completely discharging the token. The same token may then be used for the IBS transaction if or when it is needed. It is presently contemplated that rather than employing shift register storage on such a Backup Set token, storage will be designed around random access memory. The description which follows however will for simplicity assume that the backup token is based on shift registers as in copending application Ser. No. 927,297, but containing extra length shift registers.

Prior to initiating a CBS step, the user has acquired a Backup Set consisting of a token and a disk. The disk, as acquired by the user, stores encrypted token data, $E_{CSK}$-(token data). The token, as acquired, stores clear text token data.

The CBS step proceeds as follows:

A utility program signals the coprocessor that a CBS sequence is about to begin.

The coprocessor requests and is given the encrypted token data corresponding to the token portion of the Backup Set.

The coprocessor decrypts the token data and selects the amount of the token data that will be used. "Use" of a portion of the token data implies that this portion of the token data will be destroyed; the remaining portion of the token data is available for subsequent executions of the CBS procedure, for example when the user obtains a subsequent application, the rights to which he desires to backup.

The coprocessor generates a random number of length equal to the amount of the token data to be used and employing the random number "reads" or challenges the token and obtains the token response. Since the coprocessor already has available to it the clear text token data and the random number it has generated, it can predict or compute the correct response. The computed response and the actual response of the token are compared. If the comparison indicates that the token response and the computed response do not correspond, then an invalid token has been presented, an error message is returned, and the sequence terminates. Assuming, however, that the computed and actual responses correspond, then the transaction continues. By reading or challenging the backup token, the token data contained therein is changed (as well as verified). Changing the token data invalidates all copies of any previous backup. Thus the necessity for the length of the token; it can only be used a number of times given by the ratio of the bit length of the token portion to the portion used each time the CBS step is executed. When the token contains only enough data for one more transaction, it may be read to be destroyed and a new backup token may be started.

For the remainder of this transaction, it is assumed that the cryptographic system employed in the coprocessor allows any number to be a valid key. Random numbers are thus valid keys. This property is a characteristic of the DES system.

Having verified the authenticity of the token, the coprocessor now encrypts, under a second random number, the remaining, unused portion of the token data, the allowed portion of its key store and the unique supervisor (USK) key which identifies that source processor. The encrypted block, as described, can then be stored on a disk. This file will be used for the Install Backup Set procedure.

A copy of the random number used as an encryption key above is now encrypted under a supervisor key using the encrypt vendor key procedure. This datum is now stored on the backup disk.

These files can be copied in the same way the protected software can be copied, i.e. an unlimited number of times. However, the file is usable only with the token and then only in the event the token has not been read in the interim. As already described, any subsequent transfer operations require invalidating the token. The Install Backup Set step is now described, assuming that the user has access to both the file that was created during the last execution of the CBS step, as well as the token, which has not been read in the interim.

We also assume that in the interim the user's coprocessor, the source coprocessor, has failed, but the user has available another (sink) coprocessor. The Install Backup Set procedure will install, on the sink coprocessor all the rights to execute that had existed on the user's source coprocessor (to the extent backup was allowed). However, in order to protect the software vendors, the entire collection of rights to execute will be conditioned by a grace period. During the grace period, each of the rights to execute will be operative and the user can employ them as he would have in his (source) coprocessor. During the grace period, the user can return his failed (source) coprocessor to the hardware vendor. The hardware vendor, after verifying that the coprocessor has indeed failed, will provide to the user a disk having an encrypted message verifying, to the (sink) coprocessor that the (source) coprocessor has failed so that the grace period condition on the rights to execute can be lifted. Accordingly, the IBS step includes two sub-steps; a first sub-step installs the rights to execute in the (sink) coprocessor. At the time these rights to execute are installed, they are conditioned so they become ineffective at the expiration of a grace period. The second sub-step in the IBS step is removal of the condition on the rights to execute by employing a disk acquired from the hardware vendor. The IBS step then proceeds as follows.

A utility program signals the sink coprocessor that an IBS sequence is about to begin. The coprocessor first requests, and is sent, the encrypted random number key which has been used to encrypt the backup file. This is decrypted under the appropriate CSK. The coprocessor then requests and is given the encrypted backup file. The encrypted backup file includes the encrypted token data, the contents of the key store from the (source) coprocessor and the unique supervisor key of the source processor.

The (sink) coprocessor decrypts the backup file using the random number key found in the previous step, removes the token data and verifies the token. Token verification proceeds as in verification of the Distribution Set, i.e. the verification changes the token contents. As a result, the token can be used to perform an IBS procedure only once. Assuming the token is valid, the set of backup rights to execute is installed in the permanent memory of the (sink) coprocessor, along with an expiration date, thus determining the extent of the grace period.

A message is now prepared by the (sink) coprocessor containing a copy of both coprocessors' unique keys. This message is returned with the failed source coprocessor so that the condition-lifting message from the hardware vendor can be identified by the sink coprocessor as intended for it, and as intended for the set of rights to execute of the particular source coprocessor.

At this point, the (sink) coprocessor is in the same condition that the (source) coprocessor was at the time it was last backed up, except that all the rights to execute are conditioned on the expiration date. Assuming that the user obtains, from the hardware vendor within the grace period, the verification disk, the second sub-step of the IBS step proceeds as follows.

A utility program signals the (sink) coprocessor that an IBS sequence is about to be completed. The (sink) coprocessor requests and receives the validation file and decrypts it under its supervisor key (the USK of the sink). If the file contains the unique key which identifies the (source) coprocessor, then the condition is lifted. If the file does not contain the unique key of the (source) coprocessor, then an error message is returned and the sub-step is not completed.

Backup Through Inter-Processor Communication

In the preceding, the "hardware" backup has been described as comprising the CBS and IBS procedures, both of which rely on an extended token. Use of a token or extended token however, is not essential to "hardware" backup, and an intermediate coprocessor can be employed in lieu of the token or extended token for "hardware" backup purposes so long as the intermediate coprocessor can be arranged to firstly communicate with the source coprocessor (for the CBS procedure) and then communicate with a sink coprocessor (for the IBS procedure).

The inter-processor variant of the "hardware" backup procedure is now described.

For this description, we assume that the source coprocessor is in communication with the "intermediate" coprocessor. The coprocessors initially exchange encrypted random numbers, each encrypted under a supervisor key selected by the transmitting coprocessor. As already described, each of the coprocessors can decrypt and recognize that it has decrypted the encrypted random number transmitted by the other coprocessor even though it is not initially aware of the specific supervisor key employed. Assuming that each of the receiving coprocessors successfully decrypts the encrypted random number, they both combine those clear text random numbers to generate the Session Key which will be used for subsequent communications.

The source coprocessor then extracts the application key (AK) or keys sought to be backed up from its permanent memory and encrypts that key information and its USK under the Session Key to generate an encrypted key block. This is stored on a backup disk. The Session Key is stored by the intermediate coprocessor in its secure memory along with a descriptor indicating that the key corresponds to a backup set. At this point the intermediate coprocessor has possession of the key needed to access the AK or AKs which are being backed up and were it not a trusted recipient, it could generate spurious rights to execute. However, the identification procedure referred to above has identified, to the source coprocessor that the intermediate coprocessor is a "member of the family". As such a member of the family, the logical and physical security of the intermediate coprocessor protects the right(s) to execute which have been transferred from spurious duplication or use. The actual encrypted application(s) can be transmitted to the intermediate coprocessor for the IBS procedure, by any conventional means.

If at a subsequent time the source coprocessor is requested to transfer right(s) to execute which have been backed up via an "intermediate" coprocessor, as already described that transaction cannot take place until the source coprocessor communicates with the "intermediate" coprocessor to invalidate the backup rights. Such communication has only three essential components. The first component is the identifier sequence as already described. This satisfies the source and intermediate coprocessors that the communicating parties are indeed "members of the family". The second component is the transmission from the source coprocessor to the intermediate coprocessor of a message requesting invalidation of the backup rights key. The third component is the reply from the intermediate coprocessor that it is indeed the intermediate coprocessor which stored the backup rights and that the rights have been invalidated. The backup rights stored in a "intermediate" coprocessor can either be installed, using an IBS procedure, in the intermediate coprocessor, or can be installed in a different (sink) coprocessor. If the backup rights are to be installed in the intermediate coprocessor, that action is readily effected by a user request through the host associated with the intermediate coprocessor; the rights are installed without requiring a token but, as already described, those rights are conditioned on the grace period.

In the event that an IBS procedure using an intermediate processor is performed, the processors first establish their mutual identities as "members of the family" by establishing a session key. The random key may then be encrypted under the session key and transferred to the sink coprocessor. The sink coprocessor is thus authorized to install the set of backup rights to execute with the grace period and prepares a message for the hardware manufacturer as previously described.

Encrypt Vendor Key

As described both in this application as well as in copending application Ser. No. 927,629, the coprocessor is also used to provide a service to a software vendor of encrypting the software decryption keys (AK). It is essential to the protection provided by the entire software copy protection system that the supervisor keys (CSK) which are used to encrypt the software vendor's decryption key be maintained secret. By allowing the software vendor the use of a coprocessor and the ability to encrypt an unlimited number of keys, the software vendor is in a position to mount a conventional "chosen plain text" attack on the hardware vendor's encryption keys (CSK). In the event that a software vendor were able to learn the hardware vendor's keys (CSK), that software vendor could use those keys in an attack on encrypted software of other software vendors. The "chosen plain text" attack requires that the attacker have access to sets of corresponding plain text and cipher text. Using these sets the attacker may attempt to identify the key which will produce the cipher text from the plain text or visa versa. The difficulty of doing this is, of course, dependent on the cryptographic system chosen and the computing power available to the backtracking task. Some cryptographic systems (such as DES) are extremely resistant to unlimited plain text attacks.

In a first limitation on use of the coprocessor in a plain text attack, the coprocessor is arranged so that the software vendor requires authorization from the hardware manufacturer in order to create rights to execute. This authorization is sold, by the hardware vendor to the software vendor. Accordingly, one limitation on the software vendor's use of the coprocessor in a plain text attack is the economic cost expended in generating sets of plain text and corresponding encrypted text. Another technique is the use of the following Encrypt Vendor Key (EVK) procedure.

A utility program signals the coprocessor that an EVK sequence is about to begin. The coprocessor requests and is given the key (AK) to be encrypted, typically a software vendor's key. The key is supplied by the software vendor along with desired settings of supervisor flags. These flags control whether or not the supervisor will allow (for example) backup or transfer of the associated key.

The conditions of execution which will be examined and/or changed by the application key are also supplied. It should be understood that in the following discussion AK refers to the entire datum (flags, key and conditions) to be prepared for transfer by this process.

The coprocessor generates a random number (RN) and uses it to pad the front end of the key AK. The coprocessor pads the back end of the key with a recognition flag (RF). As previously described, the RF may be a MAC of any kind which is appropriate both to verifying that the correct CSK has been used (during decryption) and to the cryptographic system employed by the coprocessor. Both the random number and the recognition flag are unknown to the user, e.g. the software vendor. The coprocessor encrypts the resulting block under a supervisor key (CSK) and passes the result back to the utility program. The result, $E_{CSK}$(R-N.AK.RF), where "." represents string concatenation, i.e., 01.111 produces the string 01111, can be decrypted by any coprocessor that is aware of CSK. The result of such a decryption RN.AK.RF includes the three components, i.e., a random number (RN), the decryption key (AK), and a recognition flag (RF). The decrypting coprocessor can always identify AK so long it has a priori access to the length of the suffix recognition flag. The random number padding assures that even if the same key (AK) is submitted many times, the resulting blocks and the encrypted results will be different thus foiling the plain text attack. The EVK procedure has another advantage in that so long as the decrypting coprocessor has a priori knowledge of the recognition flag (RF) it can decrypt the encrypted block without specific a priori knowledge of CSK so long as it has a priori knowledge of all possible CSKs. More particularly, assume that each coprocessor is provided by the hardware vendor with CSK1-CSK5. If appropriate measures are taken to avoid cryptanalytic attack one can further assume that the recognition flag (RF) which is used is always the encryption key itself. These measures must in the case of block ciphers include that the RN is not an integral number of blocks in length. Further assume that the encrypting coprocessor randomly selects CSK3 with which to encrypt a particular software key AK. Thus the encrypted block is $E_{CSK3}$(R-N.AK.CSK3). Any other coprocessor having access to CSK1-5 can correctly decrypt this block even though it is not aware which of the keys CSK1-5 have been used. It is only necessary for the coprocessor to decrypt the encrypted block with each of the keys CSK1-5. In only one instance will the plain text version include, as a suffix, the decryption key actually used.

Virtual Key Storage

In any practical implementation of the software protection mechanism described herein and described in Ser. No. 927,629, there must be some limit to the ability of the coprocessor to store rights to execute. If a user obtains such a number of rights to execute greater than can be stored in the coprocessor, the user could convert seldom used rights to execute back to transportable form through the transfer transaction. The act of swapping AKs into and out of the coprocessor by these methods could easily prove burdensome to users and would be contrary to the spirit of this mechanism. It is easy, however, given the resources of the coprocessor, to overcome this problem.

In the simplest case, the AK represents the right to access the services of a piece of software. Extending this concept slightly, a Meta-AK (MAK) may be thought of as representing the right to access a collection of rights to execute. This sort of Key has already been seen in a limited form in the RK or random key used in the backup transaction.

Assuming a user has filled all the key positions in his processor and wishes to install yet one more, the coprocessor can give the user the option of starting a file of keys on a system disk (hard or floppy). This collection of virtualized keys is stored in an encrypted form under a MAK. Each time the collection is accessed to move or add an AK, the collection is re-encrypted under a new random MAK. The MAK is stored in the key store and is marked as a MAK in the flags which control backup and transfer to facilitate its correct handling by the processor. The change of MAK on each access is needed to keep the virtualized key store which is used by the processor synchronized with the actual collection of rights to execute possessed by the user. Copies of old virtualized key stores which contain transferred virtualized rights to execute cannot be foisted on the coprocessor because they will not decrypt correctly on loading.

A specific procedure for creating virtualized keys (for the purpose of freeing up key storage) proceeds as follows. A utility program running on the host signals the coprocessor that the user has requested creation of a virtualized key. The coprocessor requests the user, via the host, to identify by location information, the AKs which should be included within the virtualized store. Based on the user identification, the AKs identified are extracted from the key store along with their flags (identifying authorization for transfer, backup, etc.), conditions of execution and location information. The coprocessor generates a random number and encrypts the block consisting of that data. The resulting encrypted block can now be written to disk (hard or floppy). The random number (the key to the virtualized store) is then written in the permanent memory in place of one of the AKs which has been virtualized. A key reference path file which maps the virtualized keys to the random number MAK index can be provided in plain text to an access utility on the host to allow reference ambiguity to be resolved. This file associates the random number key with the location information identifying the AKs which have been virtualized. If the user, at any later time, requires execution of software protected by one of the virtualized keys, the coprocessor first attempts to use the key at the referenced location. The correctness of the key found in that location can be tested by conventional message authentication techniques. This key verification can be performed by loading and decrypting a short message file with an authentication section (provided as part of the protected program). If on decryption the authentication is valid, the correct key has been found. If the authentication is invalid then the access utility can provide a list of virtualized key access paths which will contain the key if the user indeed possesses that key. These keys are obtained by decrypting the virtualized block and extracting the appropriate AK. These keys may then be tested for validity by repeating the authentication procedure described above. At this point the coprocessor has access to the selected, previously virtualized AK.

Clearly a virtualized key store could itself contain MAKs so that the size of the key store can be extended indefinitely.

Demonstration Software

The virtualized storage technique also provides for supporting demonstration software without the need for any validating mechanism such as a token source or cartridge. The transaction proceeds as described below. The set of flags which allow or disallow transfer and backup of keys includes a further flag which allows or disallows erasure of keys. If an AK is to be accepted in the absence of a token, then the data files for loading that AK include a null token descriptor so that the empty token connector will respond correctly to the token query. The flag settings for this particular AK include settings that allow it to be backed up and do not allow it to be moved or erased. Installation of such an AK also requires a search of both installed and virtual key stores to see if this key had been installed before.

Conditions for executing demonstration software (preferably) include elapsed time or number of uses. An AK installation which proceeded under conditions as described above would allow a person to acquire the right to execute a piece of software for demonstration purposes, typically a one time use. A second attempt to install the identical AK would detect the prior acquisition, since the key store is searched and the key cannot be moved or erased. The user is protected from filling his key store with useless demonstration keys by having them virtualized. The software vendor is protected from having his code reinstalled repeatedly, using demonstration software, without control.

BRIEF DESCRIPTION OF THE DRAWINGS

The present invention will now be described in such detail as to enable those skilled in the art to practice the same in the following portions of the specification when taken in conjunction with the attached in which like reference characters identify identical apparatus and in which:

FIGS. 8-16 are similar to FIG. 1 and adapted to illustrate the two steps of the backup procedure, particularly Create Backup Set (CBS) and Install Backup Set (IBS);

FIG. 19 is useful in explaining the appearance of a key store illustrating several features of the flags and conditions accompanying keys.

DETAILED DESCRIPTION OF PREFERRED EMBODIMENTS

Figure 1:
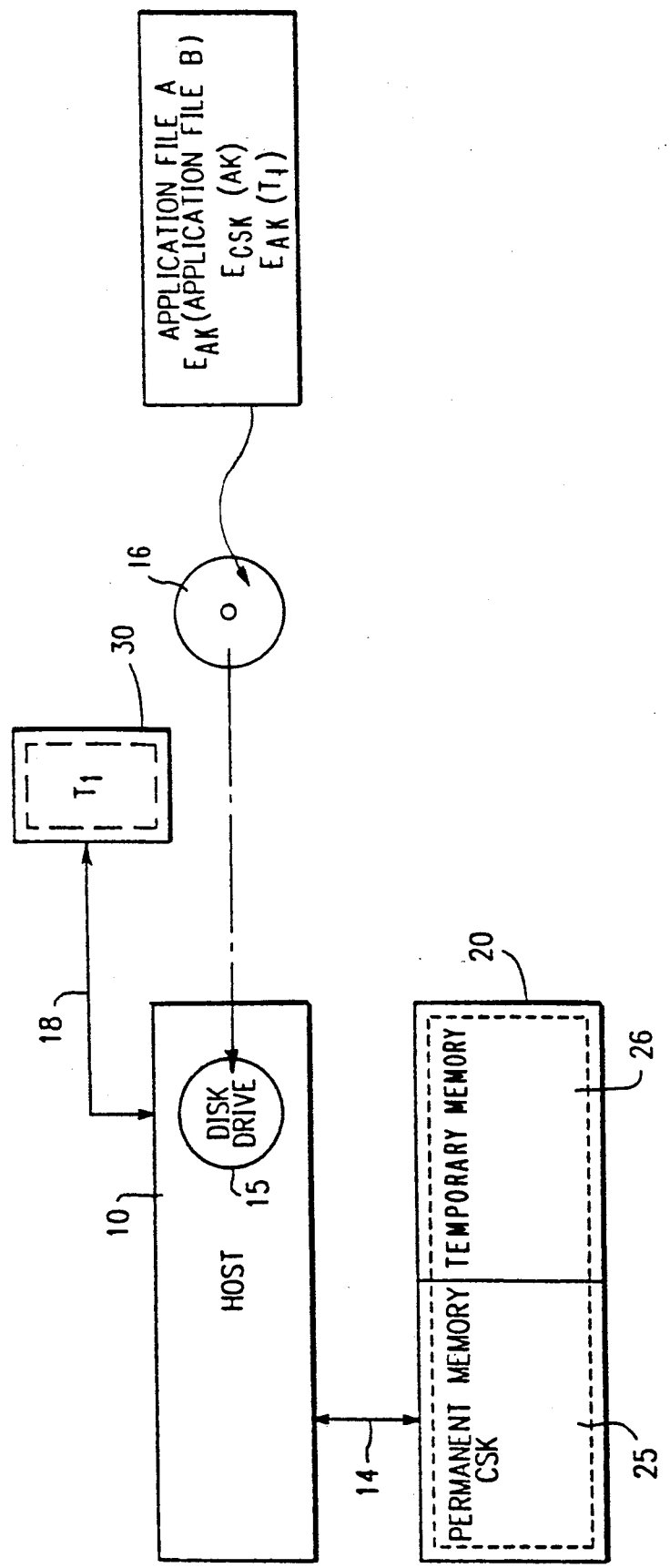
FIG. 1 schematically identifies the important components of the software asset protection mechanism and how they interact.

Reference has already been made to copending application Ser. No. 927,629, the disclosure of which is incorporated by this reference along with Ser. No. 927,297 (disclosing an example of a token). Application Ser. No. 927,629 discloses the basic software asset protection mechanism. That mechanism will be briefly reviewed in connection with FIG. 1. The software asset protection mechanism requires that the user employ a composite computing system including a host 10 and a coprocessor 20, connected via some communication link or path 14. As described in Ser. No. 927,629, the path 14 may be an internal bus, e.g. enclosed within the covers which encompass both the host 10 and the coprocessor 20, or the path 14 can comprise a link between an I/0 device included within the coprocessor 20 and an I/0 device associated with the host 10. Regardless of the specific nature of the link 14, the coprocessor 20 is provided with physical security which is effective to prevent mechanical tampering or access to the interior of the coprocessor 20 by a user or a pirate. That physical security is represented in FIG. 1 by the interior dashed line boundary. Two important features of the coprocessor 20 are its permanent, non-volatile memory 25 and a temporary memory 26; the latter akin to the working memory (RAM) of a conventional computer. The coprocessor 20 is provided to the user in a form in which it has at least one decryption key CSK stored in the permanent memory 25; the decryption key CSK is provided and stored by the vendor of the coprocessor 20. In order for the user to execute a protected application, he must install a right to execute the application in the permanent memory 25; this right to execute is represented by a software decryption key AK. As described in the application Ser. No. 927,629 the user, in order to install the right-to-execute, receives from the software vendor a distribution set which includes a hardware cartridge 30 and a distribution disk 16. As shown in FIG. 1, the distribution disk 16 typically stores three files; of these files, one is the protected application. Typically the protected application will appear as two parts in two sub-files, a plain text application file A and an encrypted or protected portion application file B. As FIG. 1 shows the application file B is encrypted under the software decryption key AK. A second file on the distribution disk 16 is the software decryption key, encrypted under the key CSK. Finally, the last file on the distribution disk is token data, $T_1$, encrypted under the software decryption key AK. As is also explained in Ser. No. 927,629, it is not essential that the third file be incorporated in the distribution disk 16 and alternatively it may be incorporated in the hardware cartridge 30.

The hardware cartridge stores the token data, $T_1$, in plain text form. Like the coprocessor 20, the hardware cartridge 30 is provided with physical security. To install the right-to-execute, the hardware cartridge 30 is coupled to or linked to the combined computing system; FIG. 1 represents this coupling via a connecting cable 18. The coprocessor decrypts the software decryption key AK in temporary memory. Before accepting the software decryption key AK into permanent memory, the coprocessor 20 verifies that the hardware cartridge 30 is authentic in a forgery-resistant query/response transaction (since its contents, $T_1$, correspond to the encrypted file $E_{AK}(T_1)$). The hardware cartridge 30, because of its destructive read property, will only contain the token data, $T_1$, if it has not been used. After verifying that the hardware cartridge 30 is both authentic and unused (and destroying the utility of the hardware cartridge in this process) the coprocessor will accept the right to execute, and store in its permanent memory 25 the software decryption key AK. With access to the software decryption key AK, the protected application file B can be decrypted and stored in the temporary memory 26 of the coprocessor 20 so that it may be executed by the coprocessor 20. Because of its physical and logical security, the plain text form, in which application file B is stored in temporary memory 26 during the course of execution and is not available to the user or a pirate.

Conditioning Rights to Execute

Figure 2:
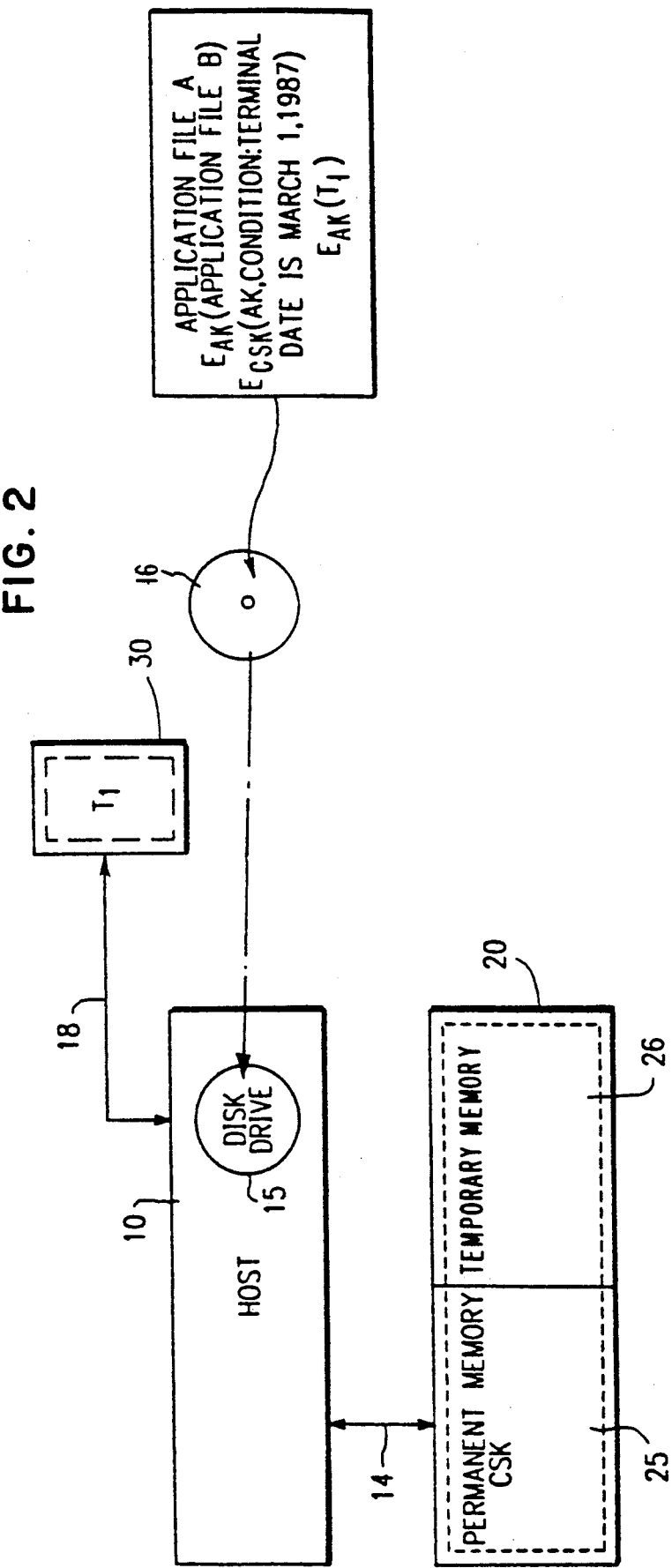
FIGS. 2-4 are similar to FIG. 1 but are useful in explaining the use and application of conditioned rights-to-execute.
Figure 3:
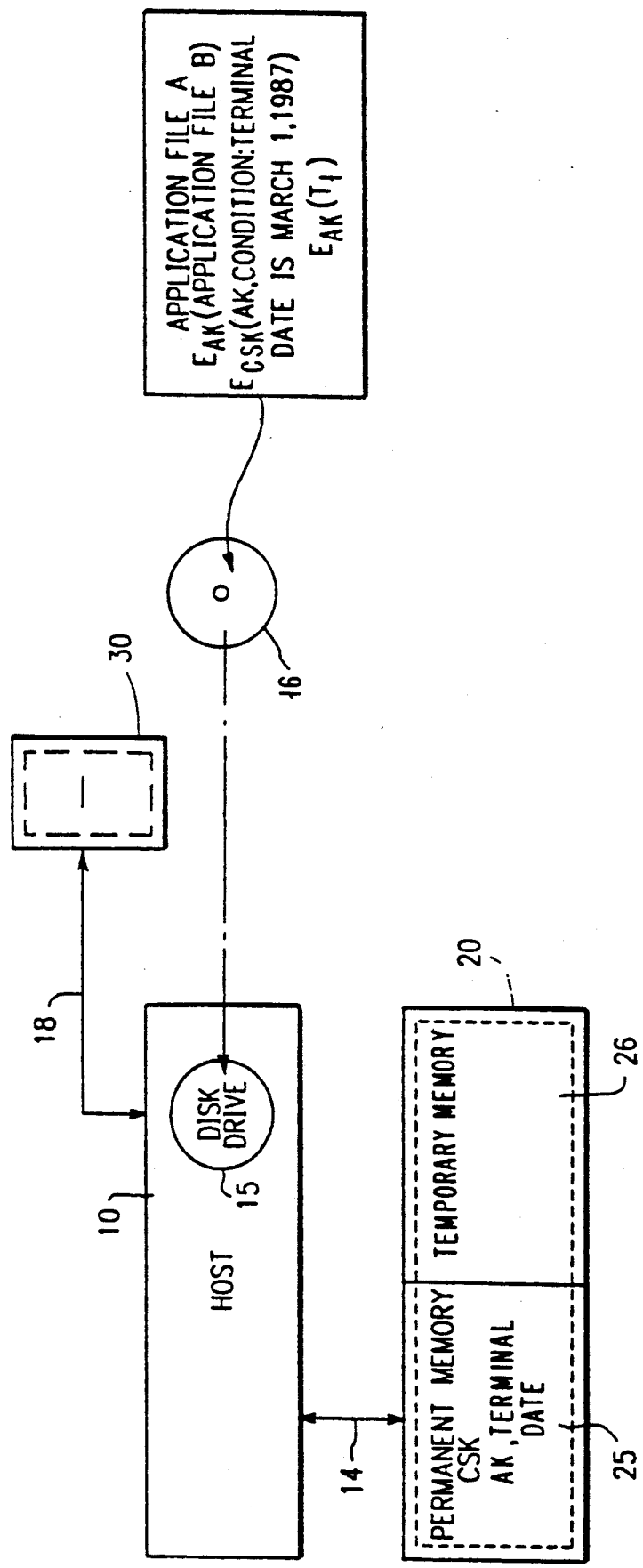

The software asset protection mechanism, as briefly described above, installs an unconditioned right to execute in the coprocessor 20. However, it is one of the features of the invention that the right to execute can be conditioned, and examples of conditions are terminal dates and times, or numbers of executions. FIG. 2 is similar to FIG. 1 except that in the case of FIG. 2 the protected portion of the application file includes a criterion for execution, e.g., if the terminal date and/or time is later than the present date then execution is allowed. On presentation of a distribution set as shown in FIG. 2 to the combined processing system of the host 10 and the coprocessor 20, the installation of the right to execute proceeds exactly as was described in connection with FIG. 1. The coprocessor 20, via the agency of the host 10, verifies (and destroys) the token 30 by comparing its plain text contents ($T_1$) with a decrypted version of the file $E_{AK}(T_1)$ read from the disk 16. On verifying the authenticity and the previously unused nature of the token 30, the coprocessor 20 stores the software decryption key AK in the permanent memory 25. The conditions of execution can be stored in the same file as the AK and can be installed at the same time as AK. In the case shown in FIG. 2, the coprocessor 20 stores the datum which can be interpreted as a terminal date and/or time. This interpretation will be performed by the protected part of the application on any occasion of its use. The terminal date storage is associated with the software decryption key AK, as shown in FIG. 3. More particularly, FIG. 3 is entirely identical to FIG. 2 except that it shows the software decryption key AK, and the terminal date and/or time, stored in the coprocessor 20's permanent memory as well as indicating that the token 30 has been depleted. Thereafter, each time the protected application is run on the coprocessor 20, prior to authorizing execution, the application uses the criterion stated in the encrypted application file that the current date and/or time not be later than the terminal date and/or time and only authorizes execution in the event the criterion is met. The current date and/or time is supplied on demand by the coprocessor 20 to the executing application.

Figure 4:
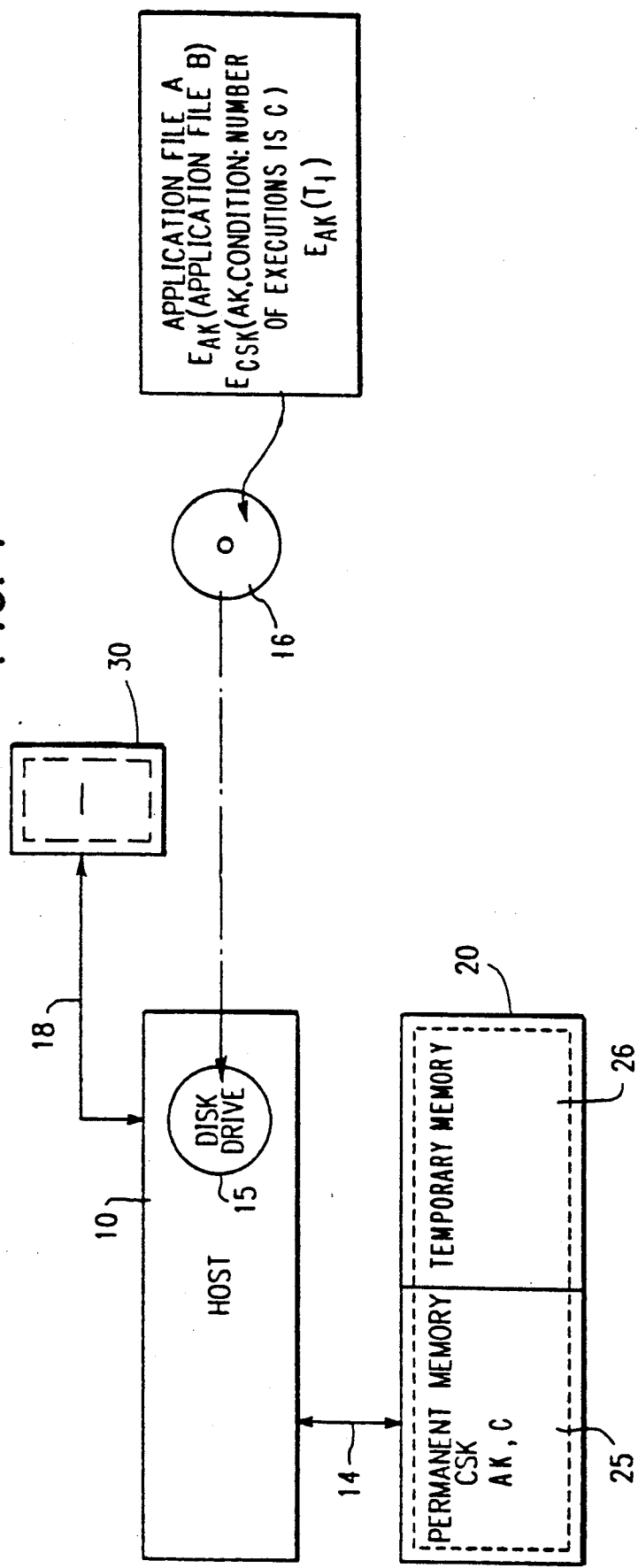

FIG. 4 is similar to FIG. 3 except that the conditions stated in the encrypted application key file gives the remaining number of authorized executions. On installation of the right to execute, the software decryption key AK is associated with a count C; each time execution of the application is requested, the contents of the count C is tested against the criterion that the number C of authorized executions remaining is greater than zero. The count C is then decremented. Only so long as C is greater than zero will execution be authorized.

It may be advisable, regardless of whether or not the condition is a terminal date and or time, or a number of executions, to provide the coprocessor 20 with instructions to delete the associated software decryption key AK, once the initial conditions are no longer met. Thus, the software decryption key AK is automatically removed from the permanent memory and thus the right to execute is deleted.

Figure 5:
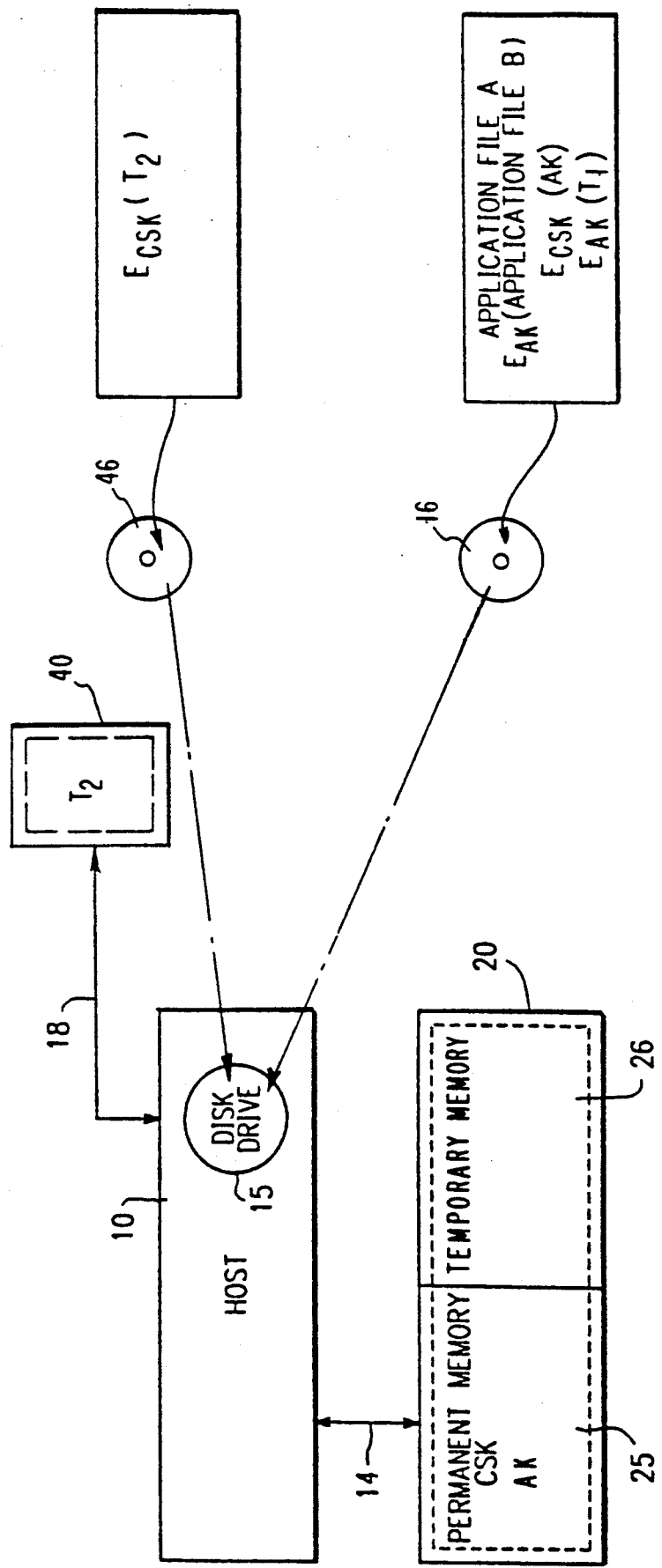
FIGS. 5-7 are similar to FIG. 1 and are useful in explaining transfer of a right to execute.
Figure 6:
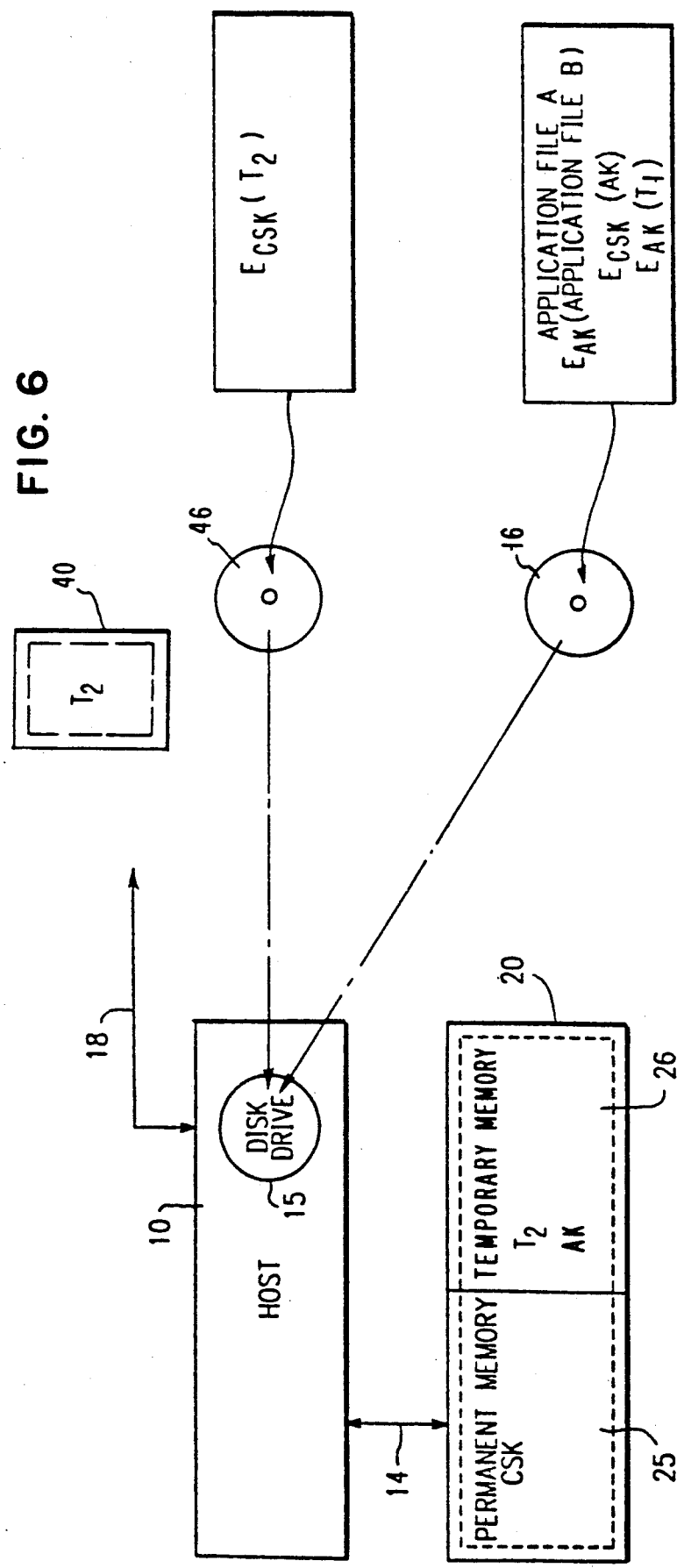
Figure 7:
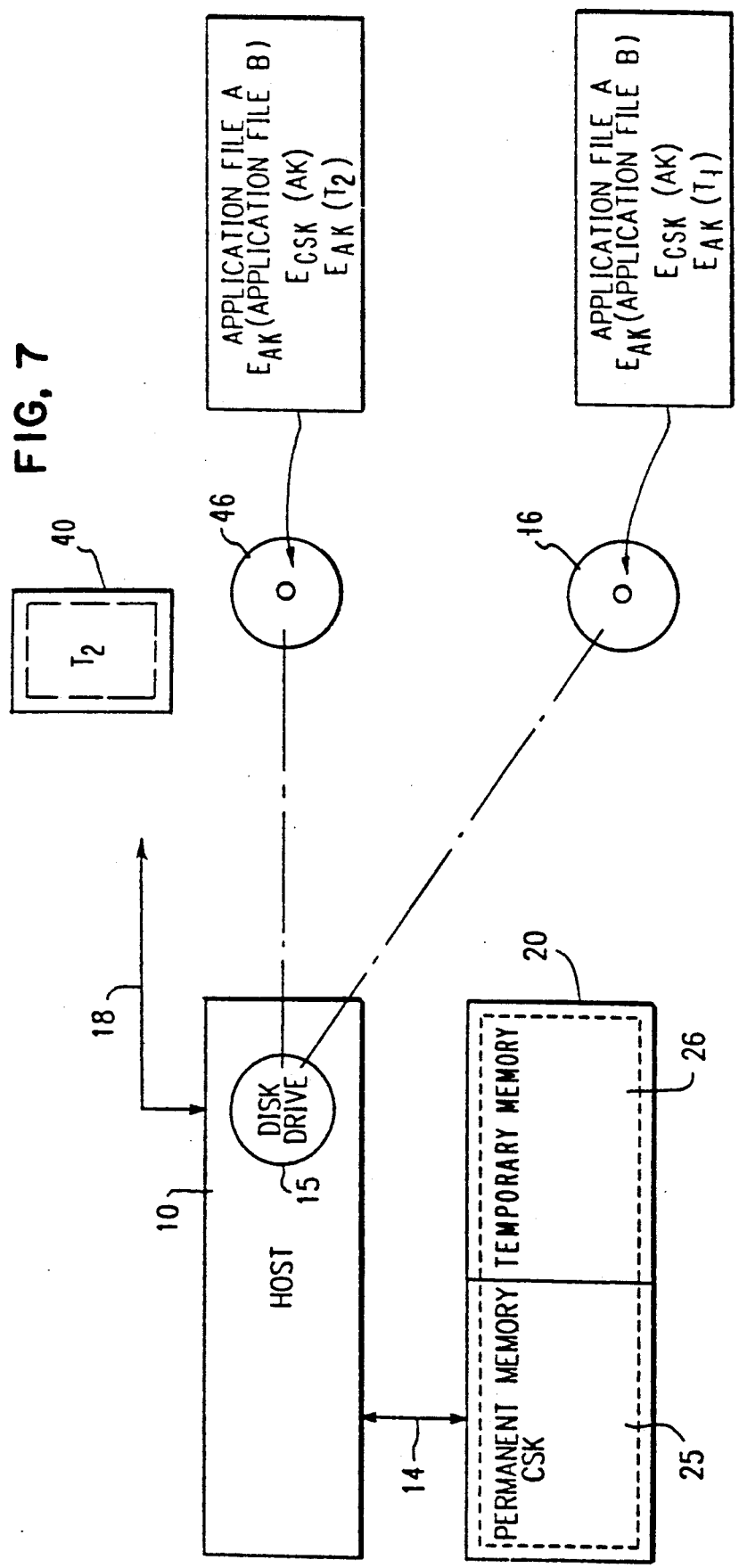

FIGS. 5–7 are useful in illustrating transfer of the right to execute. As shown in FIG. 5, the coprocessor 20 has installed the right to execute a particular protected application in the form of the software key AK in its permanent memory 25. The user, in order to effect the transfer of the right to execute, obtains a transfer set. The transfer set includes a token 40 and an accompanying disk 46. The token 40 had been loaded via a trusted source such as the coprocessor hardware manufacturer with token data $T_2$, and the disk is written with the token data encrypted under the hardware vendor's key so the disk stores the file $E_{CSK}(T_2)$. The user also has available his original source disk 16 which includes the files enumerated in FIG. 5.

FIG. 6 shows the condition of these components after the first step in the transfer sequence has been completed. More particularly, the disk 46 of the transfer set is read, and its contents are decrypted so that the coprocessor 20 can store, in its temporary memory 26 the token data $T_2$. The software decryption key AK to be transferred, is moved from the permanent memory 25 to the temporary memory 26.

The next step in the transfer sequence is to encrypt the token descriptor $T_2$ user the key RK (to obtain $E_{RK}(T_2)$) and to write a number of files onto the disk 46. The application file A (plain text), the encrypted application file $E_{AK}$(application file B), the software decryption key $E_{CSK}(AK)$ (prepared if need be as previously described) and the encrypted token data $E_{AK}(T_2)$. Thus at the conclusion of the steps shown in FIG. 7, the disk 46 of the transfer set is substantially identical to the original disk 16 which the user had acquired. The differences are that the token data (which exists in encrypted form) is different on the disks 46 and 16 and if the conditions of execution (such as count) have changed a new encrypted application key file $E_{CSK}(AK)$ has been used. This file is associated with the new token through the synchronous mechanism described previously. Transfer is thus made useless as a piracy method. Of course in installing the right to execute on the coprocessor 20, the user had used (and hence invalidated) his token containing the token data $T_1$, and as a result the file set on the original disk 16 is not usable to install a right to execute in another coprocessor. However, the disk 46 includes the encrypted token data corresponding to the token 40 which is now in the user's possession. Accordingly, the user is now in a position to install the right to execute the protected application on another coprocessor; note at the same time that the original coprocessor which previously stored the software decryption key AK, no longer stores that key. Accordingly, the right to execute the protected application has been transferred from the coprocessor 20 to the portable form represented by the distribution set including the cartridge 40 and the disk 46.

While the transfer set including the disk 46 and the cartridge 40 could be used to install the right to execute the protected application on a different coprocessor, it is also usable as a form of external storage for the right to execute, e.g. the user could if he wished install the right to execute back into the coprocessor 20 from which it was derived in the first place.

Figure 20:
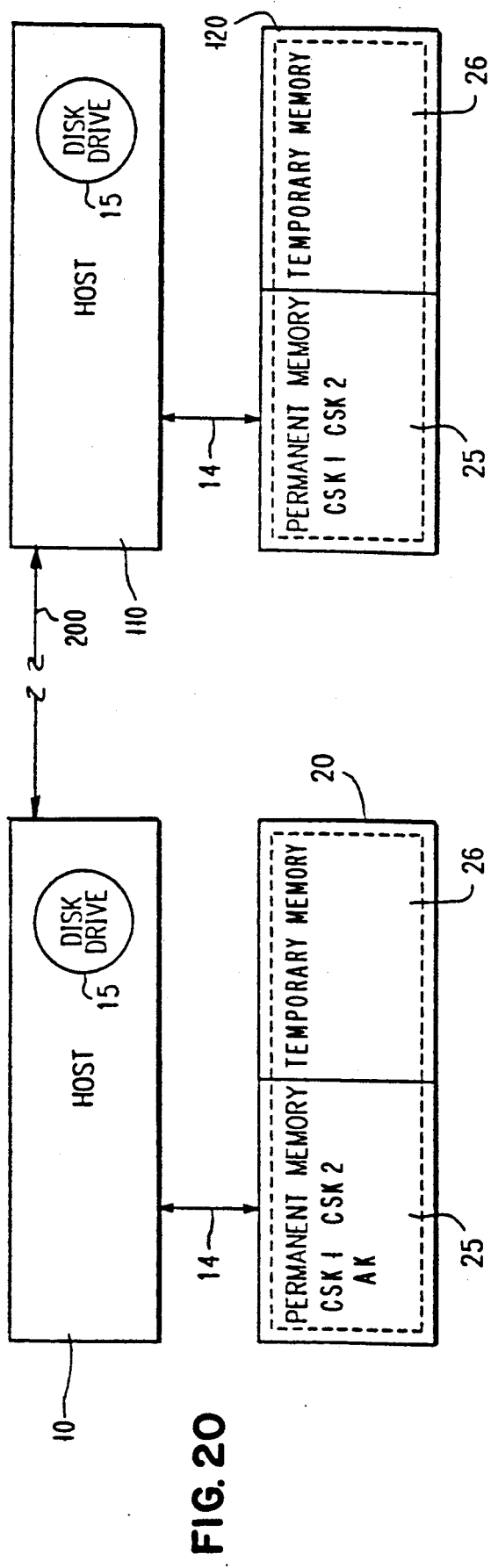
FIGS. 20 and 21 are useful in explaining a direct transfer of a right-to-execute.
Figure 21:
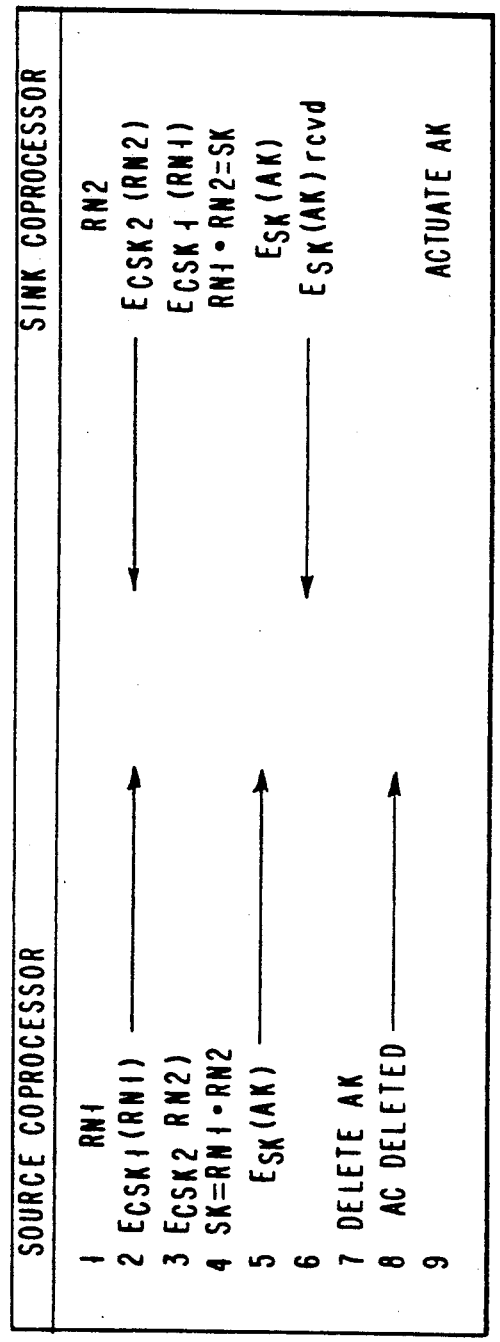

The direct transfer, from coprocessor to coprocessor, of a right to execute is shown in FIGS. 20 and 21. FIG. 20 shows that a source composite processor includes a host 10 and coprocessor 20, a sink composite processor includes a sink host 110 and a sink coprocessor 120. As shown in FIG. 20, the source coprocessor includes the right to execute (AK) which is to be transferred. In general, both coprocessors 20 and 120 would contain the same collection of supervisor keys (CSK); for generality purposes FIG. 20 shows that the source coprocessor will, in the following process, employ the supervisor key CSK1, whereas the sink coprocessor 120 will employ a different supervisor key, CSK2. Neither coprocessor has a priori knowledge of which supervisor key is employed by the other. The source and sink processors are interconnected via a communication link 200.

As already described, once communication is established, the coprocessors begin an identifier sequence to ensure themselves that the other is a "member of the family". In step 1 of FIG. 1 outlining this process, each coprocessor generates a random number, so that the source coprocessor generates RN1 and the sink coprocessor generates RN2. In step 2 each of the random numbers are encrypted under a supervisor key independently chosen by the generating coprocessor and the encrypted information is transferred, so that in step 3 the sink coprocessor 120 has access to $E_{CSK1}(RN1)$ and the source coprocessor has access to $E_{CSK2}(RN2)$. As previously explained, only "members of the family" are capable of decrypting and recognizing the random numbers transmitted thereto. Assuming that the source and sink coprocessors are "members of the family", then each can decrypt the transmitted message so that thereafter both coprocessors have available RN1 and RN2. As already indicated, the session key SK is a composite of both the random numbers, and in step 4 of FIG. 21 each coprocessor independently determines the identical session key SK.

Thereafter, after the user has identified the right to execute which is to be transferred (AK), the source coprocessor encrypts the right to execute under the session key SK and transmits it to the sink coprocessor (step 5). At this point while the sink coprocessor 120 has access to the right to execute, AK, it is not yet effective. This lack of effectiveness is enforced by the trusted safe procedures imposed on each of the coprocessors. The sink coprocessor returns a message to the source (step 6) indicating receipt of the right to execute. Consequently the source coprocessor can delete the right to execute (step 7). Finally, the source coprocessor (step 8) transmits a message to the sink coprocessor that the right to execute has been deleted. Only thereafter, in step 9, does the sink coprocessor activate the right to execute.

Having described direct transfer of a right-to-execute, or a collection of rights-to-execute it is a simple extension to describe safe procedures for a library type of software distribution among computers in a network. For the reasons already given protected software can only be distributed to composite computing system as heretofore described, i.e. each consists of a host (for example a PC) and a coprocessor. It should be clearly understood that protection is preserved even if some of the participants in the network are not composite computing systems as previously described. The only consequence of the existence of such interlopers is that the protected software is simply unavailable to them. In such a network any pair of such composite computing systems can safely transfer right(s)-to-execute by the procedures already described. The fact that transfers may be observed (and copied) is of no moment for the reasons already given. One observing a transfer of a right-to-execute would merely observe encrypted messages passing back and forth; without access to the supervisor or session keys protection is preserved by the inability to decrypt or read any of the messages. In such a network there may exist one or more software sources in the sense that a source has available many right(s)-to-execute, including, typically, multiple rights for a single protected application. Clearly such a source may transfer a right-to-execute (assuming that the software flag allows transfer) to many other composite computing systems. Each time a right-to-execute is transferred the source's collection of rights is reduced by the transferred right, and each time a right is returned the source's collection of rights is augmented by that return. The permanent memory of any source always retains a count of available rights and at any time transfer of one or all of the available rights can be effected. It should also be apparent that a source may condition a transferred right, such as for example requiring the transferee user have an account which is charged for the transfer. The transferred right could also be conditioned in terms of time or number of uses, etc. In some cases, for example if a transferred right is conditioned to expire on a date in the future then the source may be arranged to increment its collection of rights-to-execute on passing of the date in an implied transfer transaction. In other words since the transferred right was conditioned to expire on the specified date it is quite appropriate for the source to "reacquire" the previously transferred right after the specified date even though no actual transfer took place. A source may also retain a count of available rights measured by the number of executions, and of course such a source could transfer all or a part of such collection in one or many transactions. Some of those rights could also be returned to augment the source's collection.

In any transfer transaction the only necessary data actually transferred from coprocessor to coprocessor is the encrypted key (and associated flags and conditions); the protected software itself, both encrypted and plain text portions, can be transferred by any conventional means. If efficient, all composite computing systems could have preexisting access to all (or less than all) of the protected software (in encrypted form) so only the key need be transferred. Software which must be transferred could be transferred through the same network by which the keys are transferred or the software could be transferred through another network such as the postal service.

Backup the Right to Execute

In the following description, reference is repeatedly made to "reading" a token; the structure of the hardware cartridge storing the token, and the manner in which it is read is described more fully in Ser. No. 927,629, Ser. No. 927,297, the disclosure of which is incorporated by this reference.

Because the entire backup sequence refers to a failed coprocessor and installs the right to execute on a different coprocessor, we will refer to the failed coprocessor as the source coprocessor and the different coprocessor as the sink coprocessor.

It should already be clear that the right to execute, in the form of a software decryption key AK is stored in the (source) coprocessor 20.

While the coprocessor 20 has features which make it unique, it is similar in at least one respect to any other processor, i.e. it is capable of a failure. With current software distribution techniques, when a user has a processor failure, that failure interrupts his ability to execute software, but that ability can be reacquired by repairing or replacing the failed processor. In the case of the coprocessor 20, however, failure of the device may well permanently impair the right to execute which had been stored therein. Accordingly, software vendors may desire to provide their customers with a "hardware" backup of their rights-to-execute. The "hardware" backup which will be described herein is arranged to minimally impact the security of the right-to-execute, e.g., limit the number and duration of any spurious or duplicate rights to execute. The "hardware" backup to be described can be conceptualized as a pending or inchoate transfer of rights. Because the necessity for the backup depends on a future and uncertain event, e.g. failure of the coprocessor 20, it must be arranged so that the inchoate right to execute can be converted to an actual and usable right to execute entirely independent of the processor 20. For this reason, it does have the feature of generating a duplicate right to execute which could be used by the unscrupulous to thwart the protection sought by the software vendor. However, as will be described, the installation of a backup can only be performed once for any (source) processor and produces a conditioned right to execute, conditioned on a grace period (typically measured from the time of the backup installation). At the conclusion of the grace period, in the absence of further action, the rights to execute derived from the backup rights are no longer effective. The cost of this severely limited piracy to the unscrupulous is the sacrifice of the possibility of reclaiming that collection of rights to execute in the event of a real coprocessor failure. In the case of a scrupulous user, in the interim, the user is obligated to "prove" to a trusted observer, such as the hardware vendor, that his coprocessor indeed has failed. Typically, this "proof" is effected by physically transmitting the failed coprocessor to the hardware vendor. On review of the failed coprocessor, the hardware vendor will provide to the user a verification disk. The verification disk can be used by the user to provide validated authorization to the (sink) coprocessor to eliminate the condition on the backup rights to execute and convert them into rights to execute conditioned only by the condition set at the time of their acquisition. To ensure that the verification disk is prepared based on evidence of the failure of a coprocessor which is identical to the coprocessor which originally stored the right to execute being replaced, the verification disk carries, in encrypted form, a unique identifier of the failed coprocessor. This unique identifier is necessary to allow the removal of the condition. It is also to be desired that the sink processor be able to recognize that the message to remove the condition from the installed set of rights to execute is intended to be received by it. This is accomplished by including in the message a copy of the (sink) coprocessor's unique key to serve as validation of the message or by encrypting the message with the sink coprocessors unique key. Both the source and sink processor identifiers are made available to the hardware vendor in an encrypted (under CSK) message prepared by the sink processor to be returned with the failed source processor.

Figure 17:
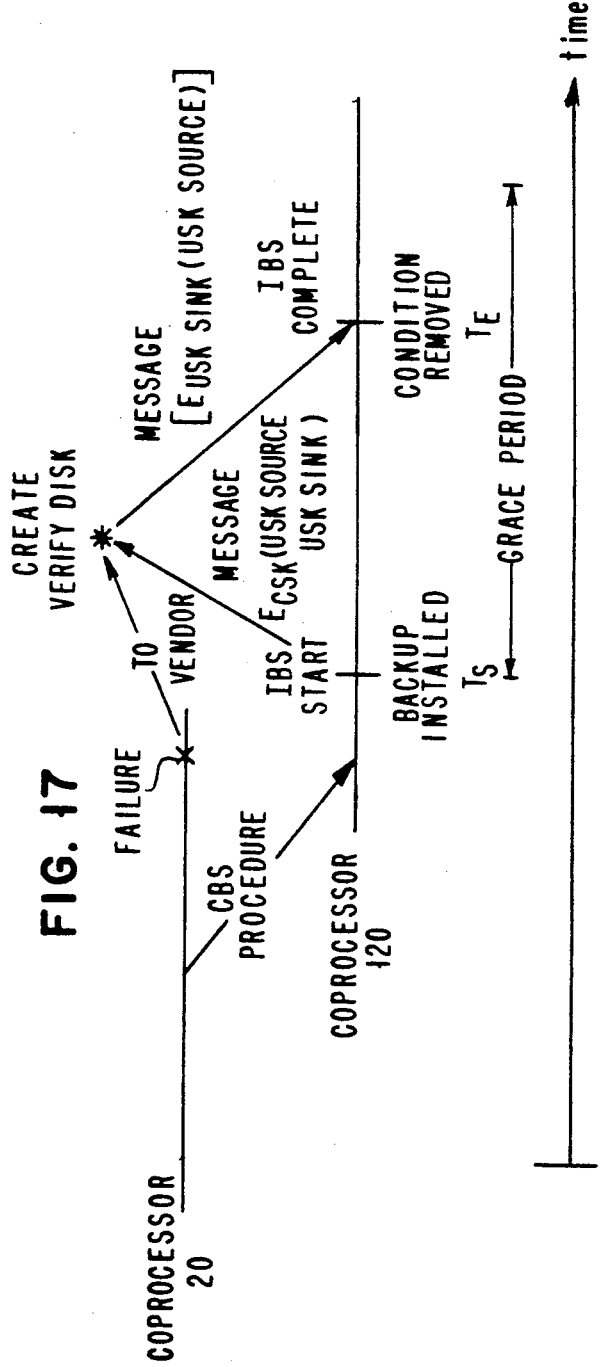
FIG. 17 shows a typical time sequence in employing the CBS and IBS procedures.

The procedure as just outlined is graphically illustrated, as a function of time which proceeds left to right, in FIG. 17. Initially, coprocessor 20 includes a set of rights to execute. A CBS procedure (create backup set) is initiated; this creates a backup set including a cartridge and a disk. Although this backup set bears some similarity to the transfer set, as will be described below, the CBS procedure is preferably carried out each time the user acquires a new right to execute, so that the single backup set provides a backup for every right to execute within the repertoire of the coprocessor or at least a backup right for each application for which backup is authorized by the software vendor. FIG. 17 also shows that subsequent to execution of the CBS procedure, the coprocessor 20 fails. Thereafter, the user effects an install backup set (IBS) procedure at a time $T_s$. Accordingly, subsequent to time $T_s$ the user can employ his rights to execute on the coprocessor 120 in lieu of the failed coprocessor 20. During that time the user can transmit the failed coprocessor 20 to the vendor who creates a verification disk as a message to the sink coprocessor 120. So long as the user receives the verification disk prior to the expiration of the grace period, he completes the install backup set procedure using the verification disk so as to remove the conditional nature of the rights to execute in the coprocessor 120 (at time $T_e$).

Figure 8:
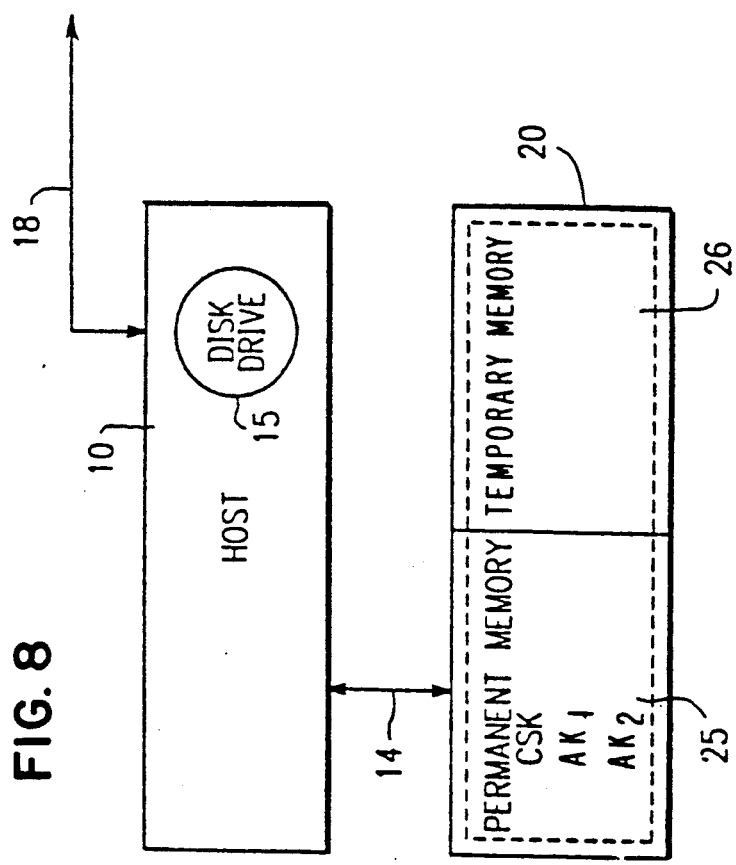
Figure 9:
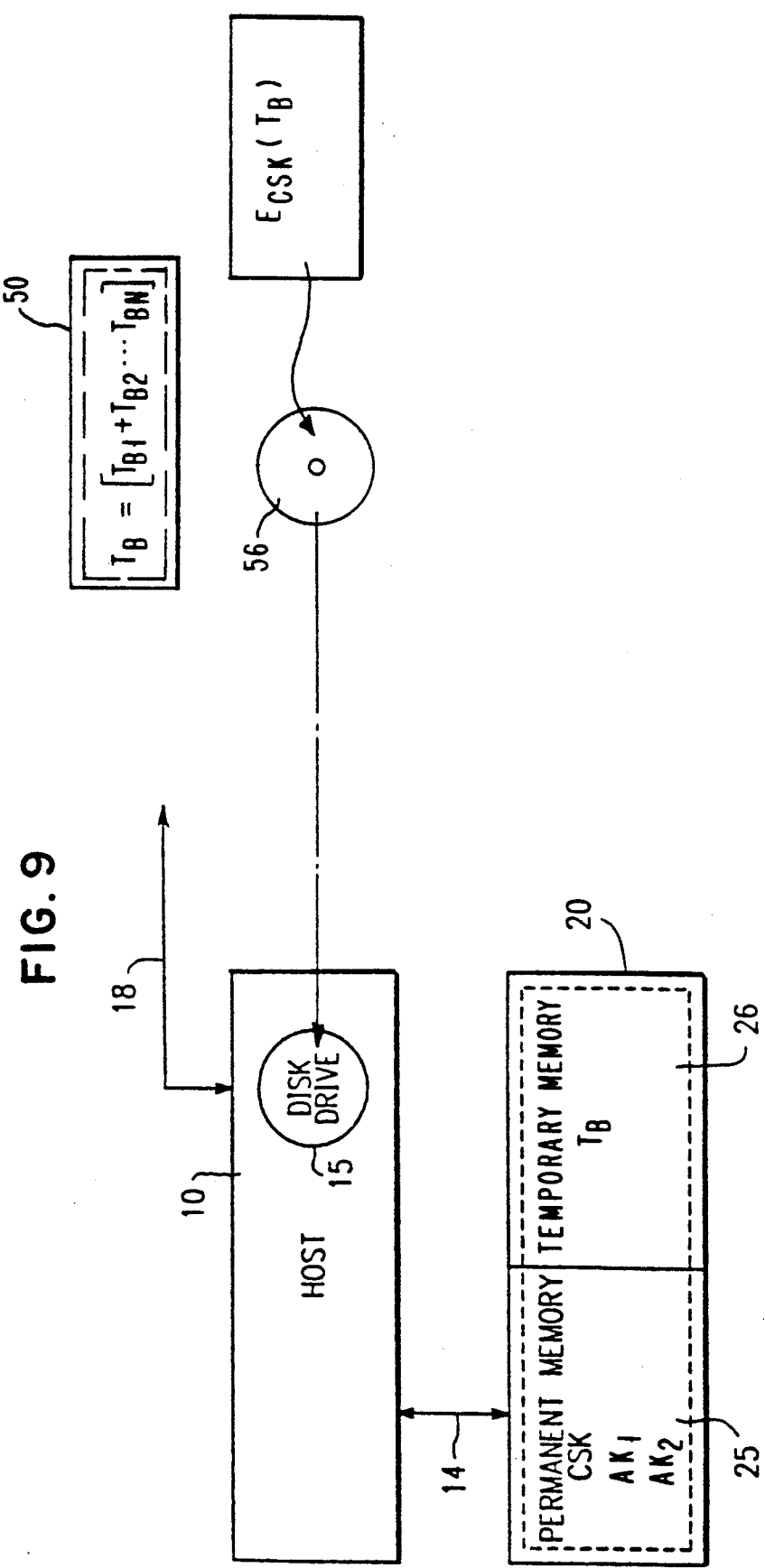
Figure 10:
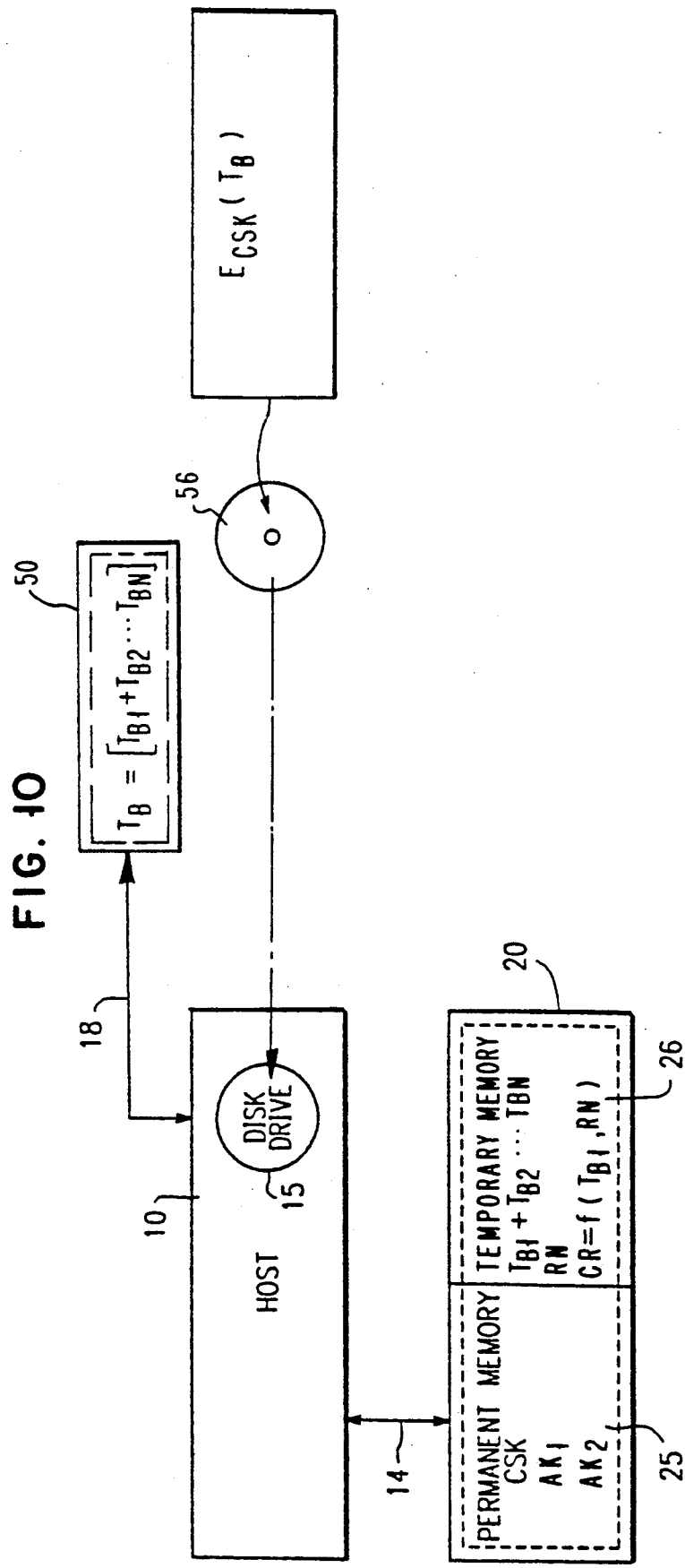

Referring now to FIG. 8, the coprocessor 20 has a collection of rights to execute represented by the software decryption keys $AK_1$ and $AK_2$. It is these rights which need to be backed up. The first step (FIG. 9) in the backup procedure is for the user to acquire an unused backup set consisting of token 50 and the disk 56. The token includes token data $T_B$ which, for illustration purposes, is shown to consist of a number of portions, TB1, TB2, and so on through TBn. The disk 56 includes the token data encrypted under the key CSK. The user effects a reading of the disk and by the appropriate utility procedure on the host 10 the coprocessor 20 decrypts the encrypted file read from the disk 56 so that it can store $T_B$ in its temporary memory. At this time, (FIG. 10) the user couples the token 50 to the host 10 via the cartridge connector 18. The coprocessor 20 selects the amount of the token data for use; for this description we assume that the portion TB1 is selected for use. The coprocessor 20 generates a random number RN and computes a function of TB1 and RN, denominated CR, the computed response of the token. The coprocessor 20 causes the random number RN to be applied to the token 50 to "read" destructively the first portion TB1. Reading this portion of the token 50 destroys the portion TB1 and returns to the coprocessor 20 the actual response AR.

Figure 11:
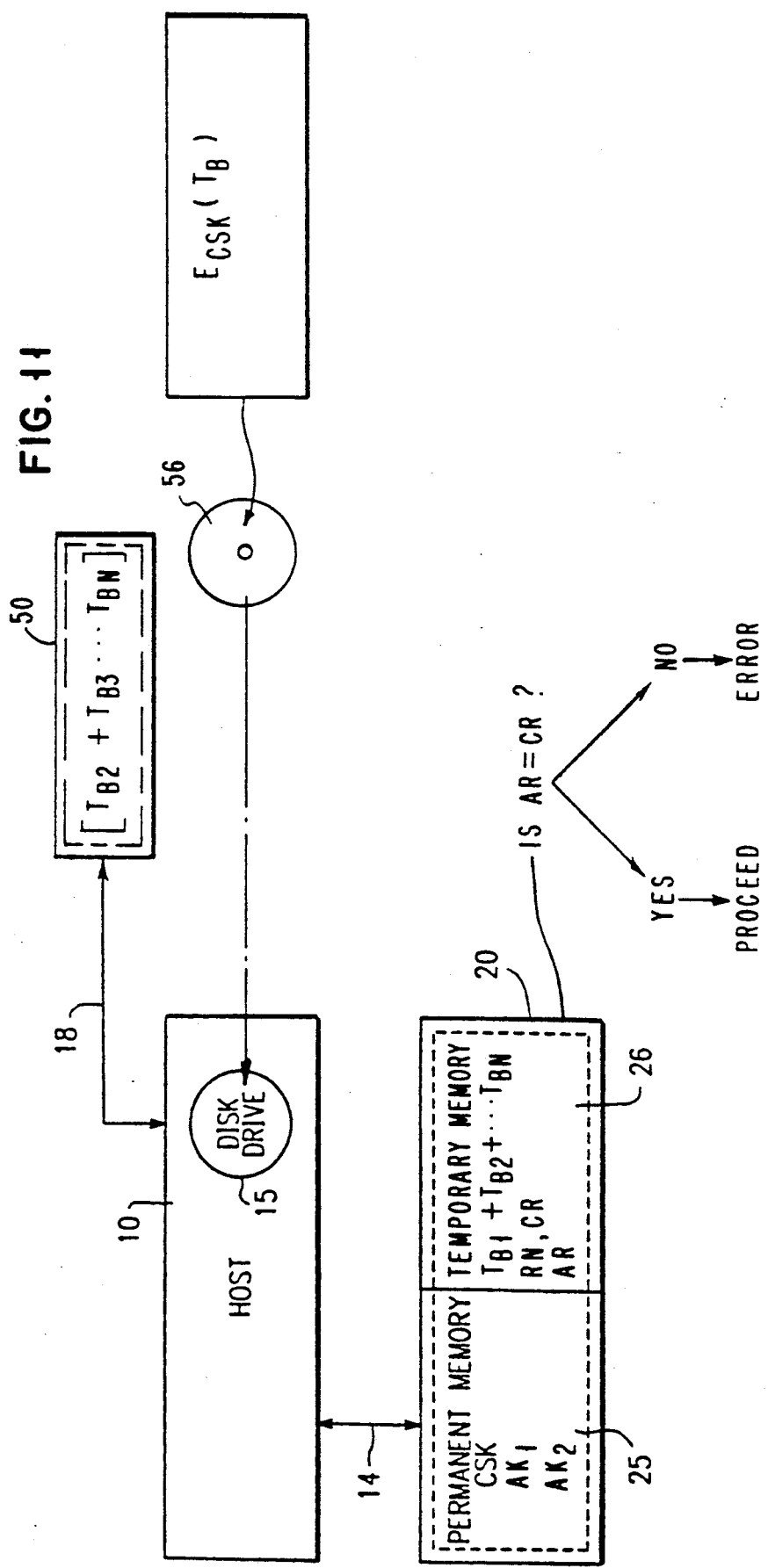
Figure 12:
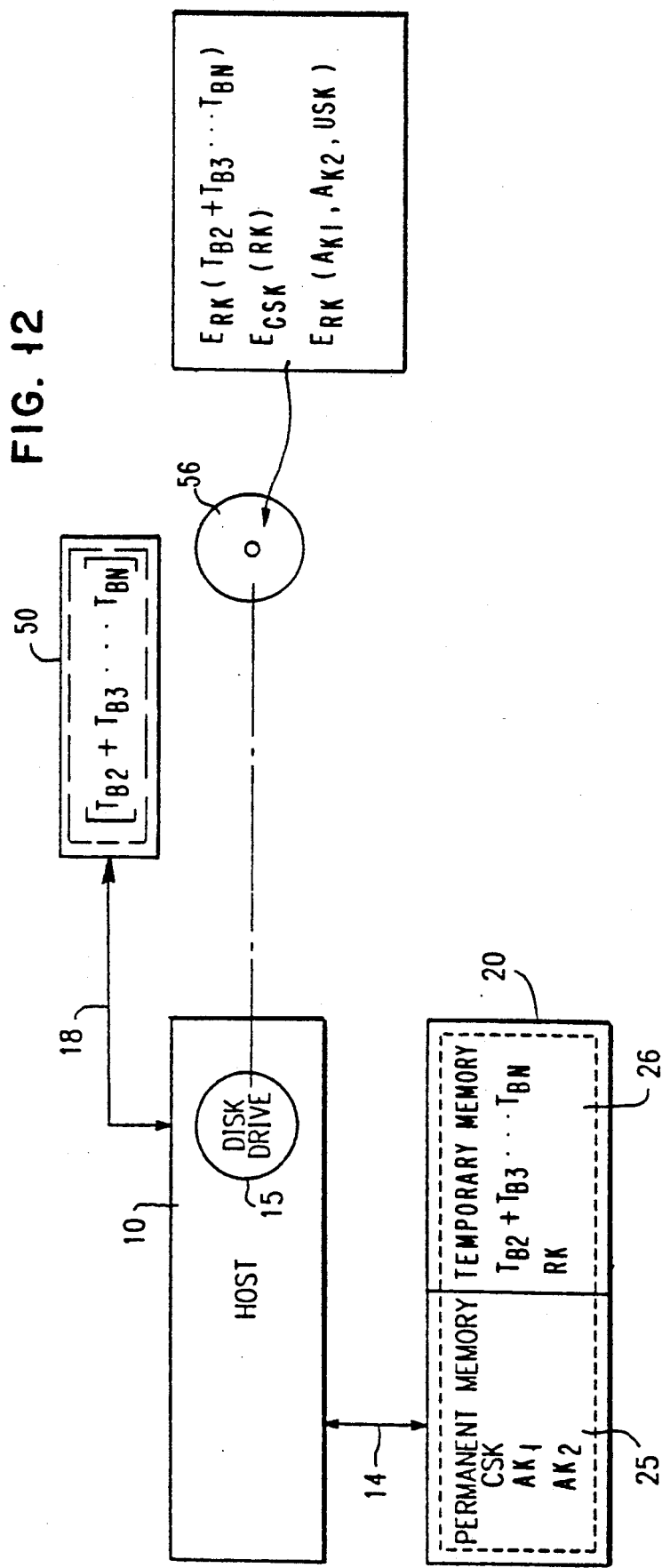

FIG. 11 shows the apparatus in this configuration, e.g. the token 50 no longer stores TB1 and the temporary memory includes the actual response AR. At this point the coprocessor 20 compares AR and CR. If they do not correspond, an error condition has been detected, the token 50 is considered unauthentic and the backup procedure terminates. On the other hand, assuming that AR and CR correspond, then the coprocessor 20 accepts the token 50 as authentic and is allowed to proceed further in the backup sequence. FIG. 12 shows that the host 10, via prompting from the coprocessor 20 has generated a new random number for use as a key (RK) and has written the disk 56 to include a number of files. The first mentioned file is merely the encrypted (under RK) version of the token data as modified by the reading operation required to verify the authenticity of the token 15, e.g. the token data $T_B$ has been modified by deleting the portion TB1 prior to encryption. The second file created on the disk 56 by the coprocessor 20 is the encrypted version of the random key used to encrypt the token data. The third file is a copy of the AKs and their individual associated flags and conditions encrypted under the key provided in encrypted form in the second file. This file also contains a copy of the unique supervisor key (USK source) which identifies the source processor. At a later time, as will be described below, in the verification process, the verification disk will identify the coprocessor whose failure has been evidenced to the vendor. The verification process will proceed to remove the expiration condition on the set of rights to execute which have been installed if and only if the verification has correctly identified both the source and sink processors. The resemblance in structure and function of this set of files and hardware to those in the acquire right to execute or transfer transactions should be obvious. At this point, it suffices to note that the user has a backup set token 50 and disk 56 in which the clear text token data in the token corresponds to the encrypted token data in the disk 56. These devices are sufficient to allow a user to install the rights to execute $AK_1$ and $AK_2$ on any coprocessor; because the procedure used to install these rights is an IBS, the set of rights to execute when installed will be conditioned by the grace period.

If, subsequent to creating the backup set shown in FIG. 12, the user obtains a right to execute another application, application 3, and installs that right to execute $AK_3$ in the coprocessor 20, he can employ the backup set to create a backup set encompassing not only $AK_1$ and $AK_2$, but also $AK_3$. In that event the user presents the disk 56 to the composite computing system wherein the encrypted token data is read. The user then performs the steps already described with relation to FIGS. 9–12. In the course of this process, the token portion TB2 will be destroyed in verifying the token; thereafter the resulting token data will consist of TB3 . . . TBn, the encrypted token descriptor file on the disk 56 will correspond and the disk 56 will include the encrypted version of $AK_3$. If the user had made copies of disk 56 prior to this point, these disks would now be useless for either CBS or IBS transactions as the encrypted token descriptor and RK on these disks would not correctly validate the backup token.

Of course, the user can continue using the backup set consisting of the token 50 and the disk 56 until there is only a single token descriptor portion left in the token 50. At this point, a new backup is required if another CBS is to be performed. The last portion of the backup token may be read by the coprocessor to invalidate the old backup, and a new backup set may be started.

In the event the coprocessor 20 fails, the user can employ the backup set consisting of the token 50 and the disk 56 in an Install Backup Set (IBS) procedure which is described below, beginning with reference to FIG. 13.

Figure 13:
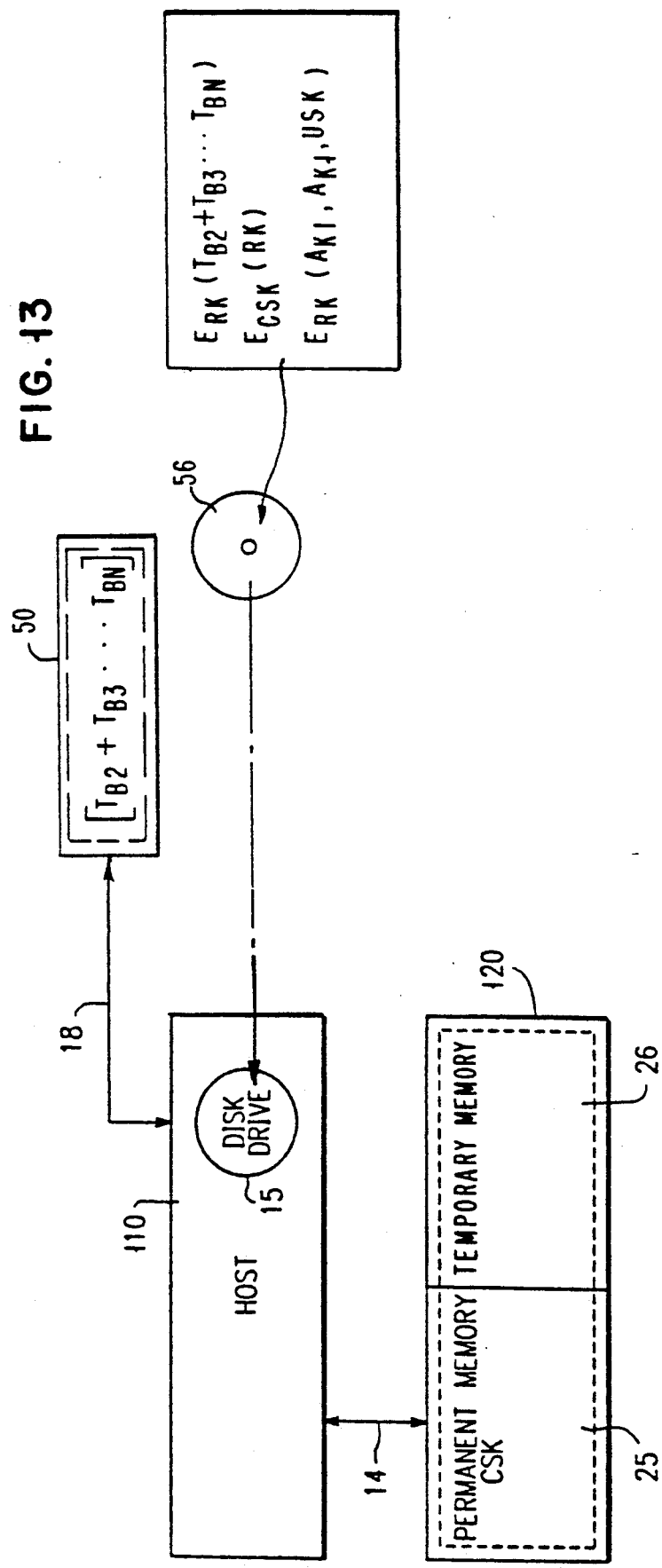
Figure 14:
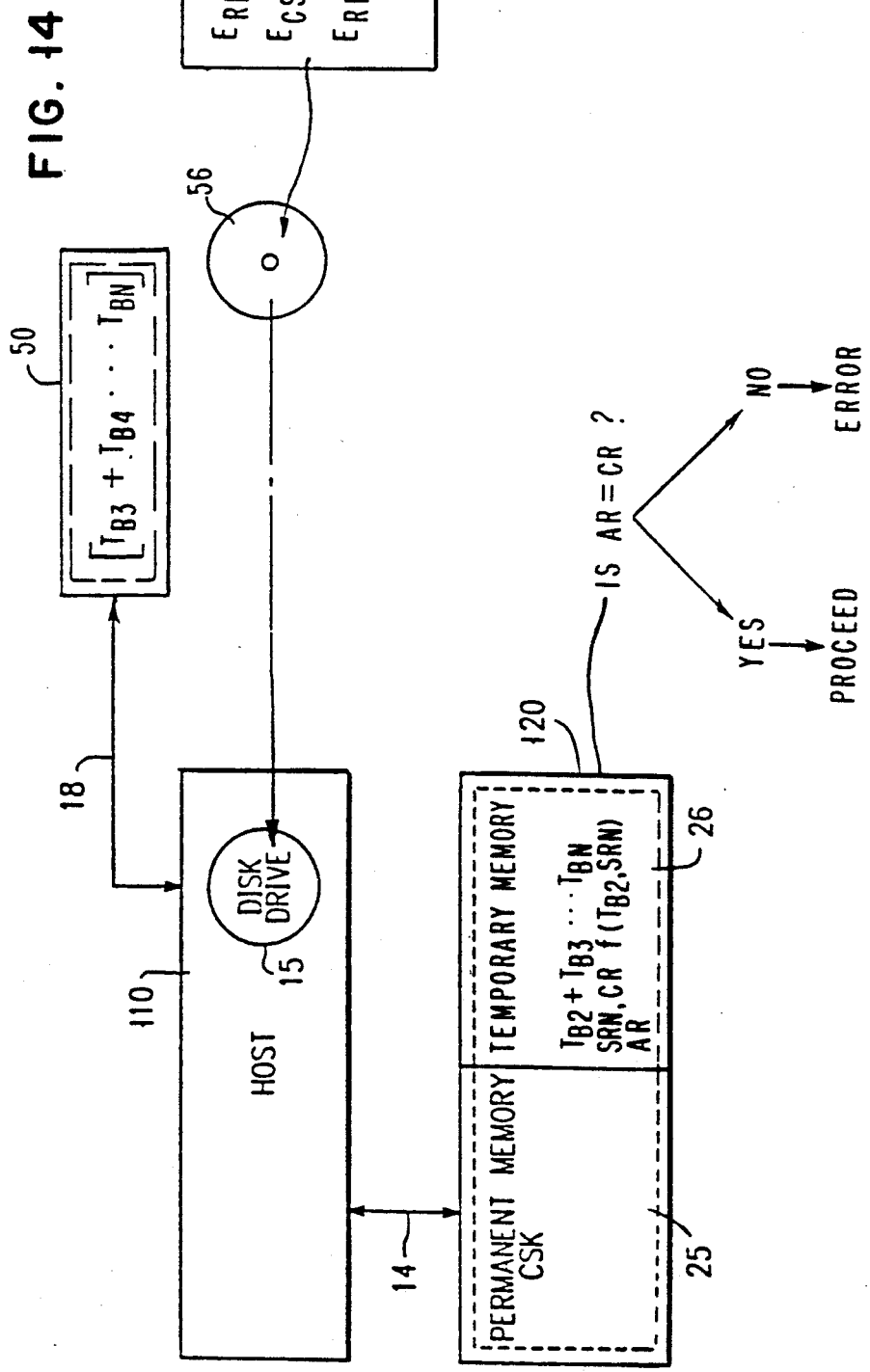

As shown in FIG. 13, the user has presented the backup set to a different composite computing system consisting of a host 110 and a coprocessor 120; it is not at all essential that the host 110 be different from the host 10 in the original composite computing system, it is only necessary that the coprocessor 120 be different from the failed coprocessor 20. As shown in FIG. 13, the coprocessor 120 does not contain any rights to execute in its permanent memory. When the user presents the disk 56, the encrypted random key $E_{CSK}$ (RK) is read and decrypted so that the encrypted token data $E_{RK}(TB2+TB3 \ldots TBn)$ can be read from the disk and decrypted as shown in FIG. 14. The temporary memory now includes that token descriptor in plain text form. The coprocessor 120 then generates another random number, SRN, and computes a function of a selection portion (TB2) of the clear text token data and the random number SRN; denominated as CR. The coprocessor 120 then interrogates the token and in doing so destroys the next portion TB2 and generates an actual response AR. FIG. 14 is a snapshot of the apparatus at this point. The coprocessor 120 then determines if AR and CR correspond. If they do not, then the token 50 is not considered authentic, an error condition is entered and the Install Backup Set procedure is terminated. On the other hand, if AR and CR do correspond, then the Install Backup procedure continues.

In the next step (which is not specifically illustrated), the encrypted file containing $AK_1$, $AK_2$ and USK (source) are read from the disk 56, decrypted and stored in the permanent memory along with their individual conditions and an indication that they are all conditioned by the grace period.

The sink coprocessor now prepares a message to the hardware vendor which is encrypted under a supervisor key CSK and is stored on disk by the host. The message contains a copy of the unique supervisor key (USKs) of both the source and sink processors encrypted under a common supervisor key $E_{CSK}$(USKsource and USKsink). This information is used to verify that the failed processor presented to the hardware vendor is the source processor and to prepare a verification message which will only allow that sink processor to relieve the expiration date condition from that source processor's set of rights.

With coprocessor 120 in this condition, the user can execute protected applications enabled by AK1 and AK2 during the duration of the grace period. The grace period is measured beginning at the performance of the IBS. In the absence of completing the IBS during the grace period, the rights to execute are suspended but may be reinstated by completing the IBS.

Assuming, however, that the user obtains the appropriate verification disk from the vendor, then the IBS procedure can be completed as shown in FIG. 15. As shown in FIG. 15, the user has presented to the composite computing system the verification disk 66. The verification disk 66 includes a single file encrypted under the unique key of the sink processor which carries within it a copy of the unique supervisor key identifying the source coprocessor ($E_{USKsink}$(USKsource)), whose failure has been proved to the vendor. The coprocessor 120 reads the verified disk 66 and decrypts the file. The coprocessor 120 can then compare the contents of the verify file with the copy of the source USK it has stored. If they do not correspond, an error condition is detected, and the conditional rights to execute remain conditioned; they will be suspended with the expiration of the grace period. On the other hand, assuming the verify file does correspond in all respects, then the coprocessor 120 is authorized to take the final IBS steps; these delete the conditional nature of the set of rights to execute $AK_1$ and $AK_2$. At the completion of the IBS procedure (FIG. 16), the coprocessor 120 includes rights to execute $AK_1$ and $AK_2$ (conditioned only by their conditions at time of source processor backup) in its permanent memory. In this condition it is in an identical condition, as the coprocessor 20 just prior to the time it failed (FIG. 8). Thus the foregoing steps provide for a "hardware" backup for the coprocessor 20 with minimal impact on the security of the software vendor's rights e.g. unauthorized duplication of the right to execute.

The backup procedures employing a token use the token and the procedures associated with it to validate to any coprocessor to which the set is presented, that it can accept the rights to execute which are represented by the set. When an "intermediate" coprocessor is employed for backup purposes, the token is unnecessary; it is the procedures which govern the coprocessors (and which are beyond the reach of a user) which provide the safety. Thus, in the case of using an "intermediate" coprocessor for backup purposes, the disk 46 is prepared essentially similar to the manner in which it is prepared when a token/disk pair are used except of course that the disk file representing the token data is completely unnecessary. Perhaps the only other difference is that when the backup set was employed, the decryption key is encrypted under a supervisor key; such an arrangement if used without the cautions might allow any coprocessor to whom such a disk was presented to accept the backup. To prevent this, the key under which the decryption key is encrypted is a Session Key, which is generated between the source coprocessor and the "intermediate" coprocessor. The generation of such a Session Key has already been described; the only information stored by the "intermediate coprocessor" is the Session Key, along with an indication that it is associated with a backup. Because the transfer procedures require invalidation of any existing backup, the "intermediate" coprocessor can be assured that if it has the Session Key available, any Install Backup Set procedure is valid. And, as has already been described, the backup set can be installed on a "sink" coprocessor so long as the "intermediate" coprocessor transfers the Session Key to the sink coprocessor.

Encrypt Vendor Key (EVK)

As described herein, the majority of coprocessors will be employed in a user's composite computing system (including, in addition to the coprocessor, the host) for the execution of protected application software. In this setting the coprocessor has the function of storing in a protected fashion rights to execute one or more pieces of software as well as the function of manipulating such right or rights as described above. As is already described, however, that is not the only function of the coprocessor; coprocessors are also required by the software vendor in preparation of the distributable package. While the software vendor could employ any computing system to provide for the encryption of token data and software under his own secret key (AK) in accordance with the software protection mechanism described in copending application Ser. No. 927,629, another component of the distributable set is the software decryption key, encrypted under the hardware vendor's key, e.g., $E_{CSK}(AK)$. In order to secure the hardware vendor's key CSK from knowledge by the software vendor, the software vendor can use a coprocessor (which is equipped with the key CSK in secure storage) for this function. It is already described that this service can be used to facilitate a plain text attack on the key CSK. While we have postulated the use of DES, which is particularly resistant to the plain text attack, by using the procedures described below that resistance can be enhanced. The plain text attack requires the attacker to have access to plain text and cipher text encrypted under the key under attack. By use of the procedures to be described, we deny the attacker access to such information.

Figure 18:
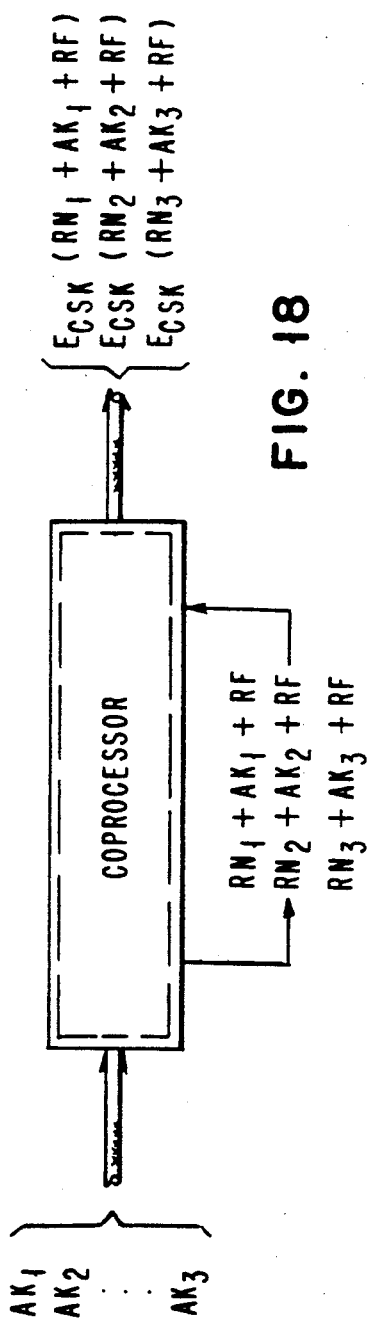
FIG. 18 is useful in explaining the Encrypt Vendor Key (EVK) procedure.

FIG. 18 shows a typical coprocessor 220 used in the mode required by the software vendor wherein input is one or more software decryption keys $AK_1$, $AK_2$, etc., and output is the keys encrypted under the key CSK. Using the convention already established, the coprocessor 220 is physically and logically secure; that security is indicated by the dashed inner boundary. If the coprocessor 220 merely outputs $E_{CSK}(AK)$ for each software decryption key input, it would readily provide an attacker with the data necessary for a chosen plain text attack.

In accordance with this aspect of the invention, however, the coprocessor 20 modifies the decryption key prior to encryption; the modification, however, is one of which all coprocessors are aware, so that all other coprocessors can perform the inverse modification. In general, each software decryption key $AK_1$ is modified by padding it, front and rear. More particularly, as shown in FIG. 18, a suffix recognition flag (RF) typically in the form of a message authentication code (MAC) of known bit length is used along with a prefix random number (RN). Thus, in response to presentation of $AK_1$, the coprocessor 220 generates $RN_1.AK_1.RF$ (where . indicates concatenation). The coprocessor thereafter encrypts the resulting concatenation of data blocks under some key CSK among the set of CSKs to produce $E_{CSKi}(RN_1.AK_1.RF)$. It is self-evident from an understanding of the DES that another coprocessor with access to CSKi can decrypt the result to produce the string $RN_1AK_1RF$. Because the decrypting coprocessor has a priori knowledge of the content and bit length of RF as well as the bit length of a software decryption key such as $AK_1$, it readily follows that the coprocessor can decrypt the message $E_{CSKi}(RN_1.AK_1.RF)$ with each of the set of CSKs until the RF decrypts correctly. Once the Coprocessor has found the correct CSK and has decrypted the encrypted information it can also segregate and specifically identify $AK_1$; the prefix $RN_1$ is merely discarded (unless as stated earlier it is needed to perform some other verification task).

An understanding of DES should also make it apparent that whereas a plain text attack requires knowledge of sets of plain text and encrypted information such as $AK_1$, $E(AK_1)$; $AK_2$, $E(AK_2)$; $AK_3$, $E(AK_3)$; and so on, someone with access to the coprocessor 220 may readily be able to identify the following sets: $AK_1$, $E_{CSKi}(RN_1AK_1RF)$; $AK_2$, $E_{CSKj}(RN_2.AK_2.RF)$; $AK_3$, $E_{ESKk}(RN_3.AK_3.RF)$; and so on. This set or sets of plain text and encrypted data is of substantially less assistance to the attacker in attempting to identify the key under which these various strings are encrypted, even with knowledge of the plain text $AK_1$, $AK_2$, $AK_3$, and so on.

Accordingly, the coprocessor 220, representing all coprocessors employed by software vendors for encrypting their software decryption keys, performs the following Encrypt Vendor Key (EVK) procedure. A utility program signals the coprocessor 220 that a EVK sequence is about to begin. The coprocessor 220 requests and is given the vendor key AK to be encrypted. The coprocessor 220 generates the random number (RN) and uses it as a prefix to pad the front end of the key AK. The coprocessor 220 also pads the back end, using the recognition flag (RF) as a suffix. The resulting block or string is encrypted under the supervisor key CSK and the result is passed to the host.

This EVK procedure has the property that by properly selecting the recognition flag, a data block can be encrypted under a selected supervisor key, selected by one coprocessor, and the encrypted block can be decrypted by another coprocessor even though the decrypting coprocessor does not have a priori knowledge of which of the supervisor keys has been selected for the encryption, so long as the decrypting coprocessor has access to a set of supervisor keys which includes all possible supervisor keys. This can be accomplished by a number of means including a priori knowledge in both processor, message authentication codes and by selecting, as the recognition flag (RF) the encrypting supervisor key. For example assume that the encrypting coprocessor selects $CSK_3$ for the purpose of encrypting $AK_n$. By the foregoing procedure, the encrypting coprocessor produces $E_{CSK3}(RN.AK_n.RF)$. We assume for this purpose that the decrypting coprocessor has access to all CSKs, although it is not aware of which CSK has been selected for the encryption. The decrypting coprocessor begins with CSK1, and decrypts the encrypted block, with each decryption key in turn. Each time the block is decrypted, the suffix is compared to the decryption key. When the suffix and the decryption key match, the decrypting coprocessor has identified the encryption key and at the same time has access to $AK_n$ since the block has already been decrypted using the correct decryption key. Similarly, if a priori knowledge is used the expected string must be found in the RF position or if a MAC is used then the MAC must be valid for the $AK_n$ or for $RN.AK_n$.

Throughout the previous description reference has been made to the software decryption key AK. For reasons which are described below, the block referred to as AK may include not only the software decryption key, but several flags, the conditions of which are selected by the software vendor so as to allow or not to allow certain procedures to be performed. For example, a 1-bit flag can be set to either allow or not allow "hardware" backup procedures to be employed. In the event the "hardware" backup flag is set to disallow the backup procedure, then any coprocessor storing that decryption key would limit the backup procedures to exclude that key (and any others so marked). The software vendor may wish to prevent transfer of a software decryption key once installed. For this purpose, a 1-bit transfer flag may be provided which will either allow or disallow the transfer operation. If a host requests a transfer procedure, that procedure is allowed only if the transfer flag is set to allow the transfer operation. Each of these limitations are to be understood as data provided to the functions provided in each coprocessor. AKs may also contain the aforementioned conditions of execution which are tested by the individual applications.

FIG. 19 is an example of the appearance of a portion of the permanent memory 25 of a typical coprocessor which has been in use for some time and stores a collection of rights to execute. As shown in FIG. 19, the permanent memory 25 includes a record (or entry) for each of a plurality of different keys, CSK1 through CSKn, AK1 through AKn and MAK1 and MAK2 are illustrated in FIG. 19. Each record includes a number of fields, one of the fields is the key itself. Associated with each key are a number of binary flags, a bit for each of the following: Meta, Condition, Erase, Transfer and Backup. It should be understood that this list is a useful subset of such flags and that the set would almost certainly be extended by one skilled in the art. The binary flag identifies, for example under the first column, whether or not the key is a Meta key and as shown in FIG. 19 only the last two records indicate storage of Meta keys. In the next column (headed "Condition"), a binary 1 indicates that the key is conditioned and as shown in FIG. 19, keys AK3 and AKn are conditioned. The third column (headed "Erase") indicates, by the binary 0, that a erasure of the key is not permitted; this condition applies to each of the supervisor keys as well as to a particular application key AK2. The fourth column, headed "Transfer" indicates, by the binary 1, that all keys except AK1 are authorized for transfer (except for the supervisor keys, the transfer of these keys is not at all necessary nor desirable). The last column under the binary flag portion of FIG. 19 is headed "Backup", and the binary 1 indicates that the associated key is authorized for backup. As shown in FIG. 19, keys AK3 and AKn are not authorized for backup.

The memory depicted in FIG. 19 includes a number of multibyte entries for each of the keys. One of the multibyte entries is headed "Condition" and this field includes the data associated with a conditioned key, and thus keys AK3 and AKn include data in that field which can be tested by criteria stored in the application they decrypt to determine if execution is authorized. The last column in the multibyte entry portion of FIG. 19 provides location and verification information which aid searches for an applications key and verification of the key as the one sought.

Software Return

From the foregoing description it should be apparent that the procedures described for manipulating rights to execute allow the software vendor to institute a software return policy which is fair to his customers as well as to himself. For economic reasons, some vendors may desire to limit the return of software to some fixed period (akin to a warranty) although that has no bearing on the present invention. A software vendor may for example allow the return of software (for full or partial credit at the vendor's selection) by requiring the user to provide the vendor with a transfer set including the right to execute the particular software application package. The manner in which the user can create such a transfer set has already been described. If the user presents to the software vendor a valid transfer set including the particular application package for which return is sought, the software vendor is assured (by the operation of the software copy protection mechanism) that the user himself no longer retains the right to execute that software. As is described above, creation of a transfer set requires deletion of the decryption key from the coprocessor.

It should be apparent from the foregoing that the invention provides wide flexibility for manipulating rights to execute in the software protection mechanism described in copending application Ser. No. 927,629. The present application describes several of these procedures by describing the logical operations and their interrelation. To generate from the description provided herein, software to execute those logical operations will be apparent to those skilled in the art and hence a specific description of software to implement the procedures which have been described is deemed unnecessary. Furthermore, although specific logical operations have been described for different ones of these procedures in specific orders, those skilled in the art after reviewing this description will understand that various changes and modifications can be effected without departing from the spirit and scope of the invention which is not to be limited by the specific embodiments described herein but is to be construed in accordance with the attached claims.

Having thus described our invention, what we claim as new, and desire to secure by Letters Patent is:

1. A method of safely extracting a right to execute from a logically secure coprocessor associated with a host processor, where said coprocessor stores at least a supervisor key and further stores a software key representing said right to execute a particular application, said host processor having access to said particular application encrypted under said software key, said method comprising the steps of:
   a) providing to the coprocessor a transfer set including at least a writable medium and a physically and logically secure medium, said physically and logically secure medium storing clear text token data,
   b) providing to said coprocessor a data block comprising said clear text token data encrypted under said supervisor key,
   c) decrypting said data block, in said coprocessor to produce said clear text token data,
   d) encrypting said clear text token data in said coprocessor under said software key to produce a corresponding data block,
   e) encrypting said software key under said supervisor key to produce an encrypted software key, and
   f) writing said corresponding data block, said encrypted application file and said encrypted software key to said transfer set and deleting said software key from said coprocessor,
   whereby said software key is removed from said coprocessor and written to said transfer set to constitute said transfer set as a backup set.

2. A method as claimed in claim 1 wherein said encrypted token data is read by said coprocessor from said writable medium of said transfer set.

3. A method as claimed in claim 1 wherein said corresponding data block, said encrypted application file and said encrypted software key are written to said writable medium of said transfer set.

4. A method as claimed in claim 1 in which said writable medium of said transfer set comprises a magnetic medium and said physically and logically secure medium comprises a read once storage cartridge.

5. A method as claimed in claim 4 in which said magnetic medium comprises a magnetic disk.

6. A method of transferring a right to execute a particular protected application from a logically secure coprocessor associated with a host processor to a different host processor associated with a different coprocessor, said method comprising the steps of:

A) extracting said right to execute and writing to a transfer set as claimed in claim 1, B) providing said transfer set to said different coprocessor storing said supervisor key but not said software key, and 1) extracting and decrypting said encrypting software key, 2) extracting said corresponding data block and decrypting said corresponding data block to produce corresponding clear text data, 3) reading said physically and logically secure medium to determine whether said clear text token data does or does not correspond to said corresponding clear text data, said reading step necessarily altering said clear text token data as stored in said physically and logically secure medium, 4a) if said data do not correspond, rejecting said transfer, or b) if said data do correspond, storing said decrypted software key, whereby said reading step destroys said clear text token data so that no further transfers may be effected by said physically and logically secure medium.

7. A method as claimed in claim 1 which includes the further steps of:

e1) presenting to said coprocessor any previously written backup set, e2) invalidating said backup set, and e3) only after executing said step e1) and step e2), if there was any backup set, proceeding to execute said step f).

8. A method of safely transferring a right to execute a protected application from a logically secure first coprocessor, where said first coprocessor stores a software key representing said right to execute said protected application, to a logically secure second coprocessor, said method comprising the steps of:

a) coupling said first coprocessor to said second coprocessor for bidirectional communication, b) challenging said second coprocessor by said first coprocessor to determine if said second coprocessor is a trusted recipient and simultaneously transferring antecedent information from said first coprocessor to said second coprocessor to allow access to an encrypted software key, c) if said second coprocessor is determined to be a trusted recipient by said first coprocessor, encrypting said software key under a specific key, derivable by a trusted recipient from said antecedent information, to produce an encrypted software key and transmitting said encrypted software key from said first coprocessor to said second coprocessor, d) if said second coprocessor is not determined to be a trusted recipient by said first coprocessor, then returning an error condition without transmitting said encrypted software key.

9. A method as recited in claim 8 in which said second coprocessor is determined to be a trusted recipient only if it stores a set of cryptographic keys in common with a set of cryptographic keys stored in said first coprocessor, wherein said step b) comprises:

b1) generating a random number at said first coprocessor, concatenating said random number with a message authentication code to produce a concatenated result and encrypting said concatenated result with a key selected by said first coprocessor from said set of cryptogaphic keys, b2) transmitting a result of step b1) to said second coprocessor corresponding to said antecedent information, b3) receiving, from said second coprocessor a message and decrypting said message with a cryptographic key from said set of cryptographic keys, if a decrypted result includes a valid message authentication code, proceeding to a step b5), otherwise, b4) repeating step b3) with each other cryptographic key in said set of cryptographic keys until each key in said set of cryptographic keys is used without producing a result as set forth in step b3), and thereafter proceeding to said step d), b5) creating a session key by concatenating said random number with the decrypted result of step b3) exclusive of the message authentication code of step b3), b6) thereafter using said session key as the specific key, whereby only if said second coprocessor is a trusted recipient will an encrypted software key be transmitted and only the second coprocessor with access to said session key can decrypt said encrypted software key to secure access to said software key.

10. A method as recited in claim 9 in which said method includes the following steps performed at said second coprocessor if said second coprocessor is a trusted recipient:

b1a) generating a second random number and selecting a key from said set of cryptographic keys, b2a) concatenating said second random number of step b1a) and a message authentication code to produce a concatenated result, b3a) encrypting said concatenated result of step b2a) to produce said message and transmitting said message to said first coprocessor.

11. A method as recited in claim 10 in which said second coprocessor:

b4a) decrypts information transmitted by said first coprocessor with a key from said set of cryptographic keys, b5a) if a decrypted result includes a valid message authentication code, retaining said decrypted result exclusive of the key of step b4a), b6a) combining said retained result of step b5a) with said second random number to produce said session key, whereby both said first coprocessor and said second coprocessor have access to said session key without said session key being accessible even if all information exchanged by said coprocessors is observed and copied.

12. A method as recited in claim 8 which comprises the further steps of:
   e) acknowledging, to said first coprocessor receipt by said second coprocessor of said encrypted software key,
   f) deleting said software key from said first coprocessor and transmitting an indication of said deletion to said second coprocessor, and
   g) in response to said indication of said deletion transferring said software key to a permanent memory of said second coprocessor.

13. A method as recited in claim 8 in which said first coprocessor stores said software key in permanent memory along with an indication as to the existence of any backup rights and in which said step c) includes the further steps of:
   c1) checking for existence of an indication of any backup, in the presence of such indication,
   c2) invalidating such backup,
   c3) verifying such invalidation and only thereafter,
   c4) encrypting and transmitting said encrypted software key.

14. A method of conditioning a right to execute a particular protected application on a composite computing system including a host processor and a physically and logically secure coprocessor, wherein said protected application includes at least a portion encrypted under a software key and said right to execute is represented by said software key stored in a permanent memory of said coprocessor, said method comprising the steps of:
   a) incorporating at least one condition within said encrypted portion of said protected application,
   b) providing to said coprocessor said at least one condition,
   c) providing for storage in said permanent memory data associated with said at least one condition along with storage of said software key,
   d) requiring said coprocessor to access said condition and said data prior to authorizing any use of said protected application,
   e) further requiring said coprocessor to compare said condition and said data to determine if said at least one condition is met, and authorizing use if, and only if said at least one condition is met.

15. A method as claimed in claim 14 wherein:
   e) said condition provides authorization for execution of said protected application no more than N times, wherein N is any integer,
   f) said data represents either a count C which is incremented each time said coprocessor authorizes execution of said protected application or said integer N decremented each time said coprocessor authorizes execution of said protected application, and
   g) said coprocessor either compares C to N or compares N to zero and said coprocessor authorizes execution if and only if N>C or N>O.

16. A method as claimed in claim 14 wherein:
   e) said limits authorization for execution of said protected application until a current date and/or time reaches a terminal date and/or time,
   f) said data represents said terminal date and/or time, and
   g) said coprocessor compares said current date and/or time with said terminal data and/or time and authorizes execution if, and only if said current data and/or time precedes said terminal date and/or time.

17. A method of providing backup for a right to execute a particular protected application on a composite computing system including a host processor and a physically and logically secure coprocessor, wherein said protected application includes at least a portion encrypted under a software key and said right to execute is represented by said software key stored in a permanent memory of said coprocessor which coprocessor also stores a first key in said permanent memory, said method comprising the steps of:
   a) providing a backup set to said coprocessor including a writable medium and a physically and logically secure medium, said physically and logically secure medium storing token data and said backup set also storing said token data encrypted under a first key,
   b) passing said encrypted token data to said coprocessor and decrypting said token data so that said coprocessor has access to decrypted token data,
   c) probing said physically and logically secure medium to verify that the decrypted token data corresponds to the token data stored by said physically and logically secure medium,
   ci) in the event there is no correspondence, rejecting said backup set and terminating said steps,
   cii) in the event there is correspondence, then
   d) modifying and then encrypting said decrypted token data under said software key,
   e) encrypting said software key under said first key, and
   f) writing results from steps d) and e) to said backup set, and writing said protected application to said backup set.

18. A method as claimed in claim 17 in which said step c) comprises:
   c1) generating and storing a random number in said coprocessor,
   c2) generating a computed response as a function of both said random number and said decrypted token data,
   c3) transmitting said random number to said physically and logically secure medium,
   c4) generating in said physically and logically secure medium an actual response by reading said token data as selected by said random number,
   c5) transmitting said actual response to said coprocessor, and
   c6) comparing said actual response and said computed response.

19. A method as claimed in claim 18 in which said step c4) includes:
   c4i) modifying said token data stored in said physically and logically secure medium so that thereafter said physically and logically secure medium stores modified token data.

20. A method as claimed in claim 19 in which said step d) modifies said decrypted token data in a fashion identical to a modification of said step c4i) so that said encrypted modified decrypted token data corresponds to said modified token data stored in said physically and logically secure medium.

21. A method of installing a right to execute on a different coprocessor comprising creating a backup set as claimed in claim 17 and comprising the further steps of:

g) presenting said backup set to said different coprocessor,
h) passing said encrypted modified token data of said step d) to said coprocessor and decrypting said encrypted modified token data so that said coprocessor has access to decrypted modified token data,
i) probing said physically and logically secure medium to verify that the decrypted modified token data corresponds to the modified token data stored by said physically and logically secure medium,
i-i) in the event there is no correspondence, rejecting said backup set and terminating said method of installing,
i-ii) in the event there is correspondence, then
j) accessing, decrypting and storing in permanent memory of said different coprocessor said software key representing a right to execute said protected application by a user of said different coprocessor, and
k) conditioning said right to execute for use only within a grace period.

22. A method of removing said grace period condition of a backup right to execute as installed by a method as claimed in claim 21 comprising the further steps of:
l) receiving an encrypted message in exchange for proof of failure of said coprocessor,
m) coupling said encrypted message to said different coprocessor,
n) verifying, by said different coprocessor that said encrypted message relates to said coprocessor, and
o) in response to said verification removing said grace period condition established by said step k).

23. A method as claimed in claim 22 in which said step i) comprises:
i1) generating and storing a random number in said different coprocessor,
i2) generating a computed response as a function of both said random number and said decrypted modified token data,
i3) transmitting said random number to said physically and logically secure medium,
i4) generating in said physically and logically secure medium an actual response by reading said modified token data as selected by said random number,
i5) transmitting said actual response to said different coprocessor, and
i6) comparing said actual response and said computed response.

24. A method of providing backup for a right to execute a particular protected application on a composite computing system including a host processor and a physically and logically secure coprocessor, wherein said protected application includes at least a portion encrypted under a software key and said right to execute is represented by said software key stored in a permanent memory of said coprocessor which coprocessor also stores a first key in said permanent memory, said method comprising the steps of:
a) coupling said coprocessor to a different coprocessor,
b) challenging said different coprocessor by said coprocessor to determine if said different coprocessor is a trusted recipient and simultaneously transferring antecedent information from said coprocessor to said different coprocessor to allow access to an encrypted backup,
c) if said different coprocessor is determined to be a trusted recipient by said coprocessor, encrypting said software key under a specific key derivable from said antecedent information to produce an encrypted backup and transmitting said encrypted backup from said coprocessor to said different coprocessor,
d) if said different coprocessor is not determined to be a trusted recipient by said coprocessor, then returning an error condition without creating said backup.

25. A method as recited in claim 24 in which a coprocessor is determined to be a trusted recipient only if it stores a set of cryptographic keys in common with a set of cryptographic keys stored in said coprocessor, of which said first key is a member of said set, wherein said step b) comprises:
b1) generating a random number at said coprocessor, concatenating said random number with a message authentication code to produce a concatenated result and encrypting said concatenated result with a key selected by said coprocessor from said set of cryptographic keys,
b2) transmitting a result of step b1) to said different coprocessor corresponding to said antecedent information,
b3) receiving, from said different coprocessor a message and decrypting said message with a key from said set of cryptographic keys, if a decrypted result includes a valid message authentication code, proceeding to a step b5), otherwise,
b4) repeating step b3) with each other key in said set of cryptographic keys until each key in said set is used without producing a result as set forth in step b3), and thereafter proceeding to said step d),
b5) creating a session key by combining said random number with the decrypted result of step b3) exclusive of the message authentication code of step b3),
b6) thereafter using said session key as the specific key,
whereby only if said different coprocessor is a trusted recipient will an encrypted backup be transmitted and only the different coprocessor with access to said session key can decrypt said backup to secure access to said software key.

26. A method as recited in claim 25 in which said method includes the following steps performed at said different coprocessor if said different coprocessor is a trusted recipient:
b1a) generating a different random number and selecting a key from said set of cryptographic keys,
b2a) concatenating said different random number of step b1a) and a message authentication code to produce a concatenated result,
b3a) encrypting said concatenated result of step b2a) to produce said message and transmitting said message to said coprocessor.

27. A method as recited in claim 26 in which said different coprocessor:
b4a) decrypts information transmitted by said coprocessor with a key form said set of cryptographic keys,
b5a) if a decrypted result includes a valid message authentication code, retaining said decrypted result exclusive of the message authentication code,
b6a) combining said retained result of step b5a) with said different random number to produce said session key, whereby both said coprocessor and said different coprocessor have access to said session key without said session key being accessible even if all information exchanged by said coprocessors is observed and copied.

28. A method of installing a right to execute on a further coprocessor subsequent to failure of said coprocessor comprising creating a backup as claimed in claim 24 and comprising the further steps of:

e) coupling said different coprocessor to said further coprocessor, f) challenging said further coprocessor by said different coprocessor to determine if said further coprocessor is a trusted recipient and simultaneously transferring further antecedent information from said different coprocessor to said further coprocessor to allow access to an encrypted software key corresponding to said encrypted backup, g) if said further coprocessor is determined to be a trusted recipient by said different coprocessor, encrypting said software key under a specific key derivable from said further antecedent information to produce an encrypted software key and transmitting said encrypted software key from said different coprocessor to said further coprocessor, h) if said further coprocessor is not determined to be a trusted recipient by said different coprocessor then returning an error condition without transmitting said encrypted software key, i) accessing, decrypting and storing in permanent memory of said further coprocessor said software key representing a right to execute said protected application by a user of said further coprocessor, and j) conditioning said right to execute for use only within a grace period.

29. A method of removing said grace period condition of a backup as installed by a method as claimed in claim 28 comprising the further steps of:

k) receiving an encrypted message in exchange for proof of failure of said coprocessor, l) coupling said encrypted message to said further coprocessor, m) verifying, by said further coprocessor that said encrypted message relates to said coprocessor, and n) in response to said verification removing said grace period condition established by said step j.

30. A method of safely distributing demonstration software only for demonstration use on composite computing systems comprising a host computer and a logically and physically secure coprocessor, wherein the coprocessor stores at least a specific key, said method comprising the steps of:

a) distributing said demonstration software in a form in which at least a portion thereof is encrypted under a software key, b) distributing, along with said demonstration software said software key encrypted under said specific key and a null token data file, encrypted under said software key, said software key including at least a condition of use flag inhibiting any coprocessor from erasing said software key, c) installing said software key on a coprocessor by:
c1) decrypting said software key under said specific key, and
c2) searching permanent memory of said coprocessor to determine if said software key had previously been installed,
c3) writing said software key to said permanent memory only if said step c2) indicates that said software key had never been previously installed, whereafter said demonstration software can be executed on said composite computing system by decrypting encrypted portions by said coprocessor, or
c4) inhibiting said writing step c3) in the event said software key had been previously installed wherefore said demonstration software cannot be executed on said composite computing system, whereby a user may install said demonstration software into a composite computing system only on a single occasion thereby protecting software vendors from users repeatedly installing demonstration software.

31. A method as recited in claim 30 in which said composite computing system includes a cartridge connector for connection to a hardware cartridge storing clear text token data and wherein said step c) further comprises:

c1.1) reading said encrypted software key and said null token data file, decrypting and temporarily storing said software key and said null token data file, c1.2) generating a random number, temporarily storing said random number, driving said cartridge connector with data corresponding to said random number and storing data produced at said cartridge connector, c1.3) computing in said coprocessor an expected response of a cartridge by combining said null token data file and said random number, c1.4) comparing said expected response with said data stored in said step c1.2), c1.5) if said comparison is favorable transferring said software key to said permanent memory and if said comparison is unfavorable not transferring said software key to said permanent memory.

32. A method of encrypting software keys as a service by a physically and logically secure coprocessor under a first key which method is resistant to a plain text attack on said first key, said method comprising the steps of:

a) accepting a software key for encryption, b) padding said software key with a number of a given length, said number including at least a component which is random, c) encrypting a result produced by said step b) under said first key, whereby said padding produces an encrypted result in response to a first encryption operation which is different form an encryption result produced on a second encryption operation even though an identical software key is presented on each occasion thus foiling a plain text attack on said first key.

33. A method as recited in claim 32 in which said step b) includes:

b1) padding said software key with a prefix comprising a random number of a first bit length, b2) padding a result of step b1) with a message authentication code of a second bit length.

34. A method of decrypting a software key encrypted as claimed in claim 32 comprising the steps of:

d) employing said first key to decrypt a result produced by said step c), and e) discarding, from a result of step d) padding added in said step b) to leave said software key.

35. A method of decrypting a software key encrypted as claimed in claim 33 comprising the steps of:
   d) employing said first key to decrypt a result produced by said step c), and
   e) discarding, from a result of step d) said random number prefix added in said step b1),
   f) discarding, from a result of step e) said message authentication code to leave said software key.

36. A method as recited in claim 33 in which said message authentication code comprises a recognition flag stored in the coprocessor.

37. A method as recited in claim 36 in which said recognition flag comprises said first key.

38. A method of identifying first and second processors to each other as companion processors which companion processors are characterized by storing a set of keys, which set includes a number of keys greater than one, comprising the steps of:
   a) at a fist processor, generating a first random number, concatenating said first random number with a message authentication code, to produce a concatenated result and encrypting said concatenated result under one key of said set of keys to produce a first identifier,
   b) at a second processor, generating a second random number, concatenating said second random number with a message authentication code, to produce a concatenated result and encrypting said concatenated result under another key, said another key selected by said second processor from said set of keys, to produce another identifier,
   c) transmitting said first and another identifiers to said second and first processors, respectively,
   d) determining, at said processors that said identifiers were generated by companion processors by:
      1) decrypting said identifiers with keys selected from said set of keys until a decrypted result includes a valid message authentication code as a portion, or
   e) determining that said first and second processors are not companion processors if all keys in said set are employed without any decrypted result including a valid message authentication code.

39. A method of inter-processor communication which restricts exchange of key information to within a class of companion processors which are characterized by storage of a set of keys greater in number than one, said method comprising the steps:
   i) using a method of identification as recited in claim 38,
   ii) combining said first and another identifiers at both said processors to produce a session key, and
   iii) exchanging key information by first encrypting said key information under said session key and transmitting said encrypted key information from said first to said second or from said second to said first processor.

40. A method of safely transferring a right to execute from a logically secure source coprocessor associated with a host source processor to a logically secure sink coprocessor associated with a host sink processor, where said source coprocessor stores at least a source key and a software key representing said right to execute a particular application and said sink coprocessor stores a sink key, both said source and sink keys included within a set of keys stored in both said source and sink coprocessors, said host processors having access to said particular application encrypted under said software key, said method comprising the steps of:
   e) at said source coprocessor, generating a first random number, concatenating said first random number with a first message authentication code to produce a concatenated result and encrypting said concatenated result under said source key to produce a source identifier,
   b) at said sink coprocessor, generating a second random number, concatenating said second random number with a second message authentication code to produce a concatenated result and encrypting said concatenated result under said sink key to produce a sink identifier,
   c) transmitting said source and sink identifiers to said sink and source coprocessors, respectively,
   d) verifying, at said coprocessors that said identifiers were generated by companion coprocessors by
      1) decrypting said identifiers with keys selected from said set until a decrypted result includes a valid message authentication code as a portion, or
      2) until all keys in said set are employed without any decryption result including a valid message authentication,
      3) terminating an attempt to transfer a right to execute if step d2) is reached, and otherwise,
   e) creating a session key at each coprocessor from said source and sink identifiers,
   f) encrypting said software key at said source coprocessor under said session key to produce a transmittable software key and deleting said software key from said source coprocessor,
   g) transmitting said transmittable software key from said source to said sink coprocessor,
   h) decrypting said transmittable software key at said sink coprocessor with said session key to recreate said software key, and
   i) storing said software key in a non-volatile memory of said sink coprocessor,
   whereby said software key has been extracted and transferred from source to sink coprocessors without exposing said software key and without revealing either said source or sink keys.

41. A method of safely increasing storage capacity without compromising security for software keys normally stored within a logically and physically secure storage of finite storage capacity, said storage accessible to a logically secure coprocessor element of a composite computing system comprising the steps of:
   a) selecting one or more software keys for storage external to said logically and physically secure storage to form a key block,
   b) generating a random number,
   c) encrypting said key block under said random number to produce an encrypted key block,
   d) storing said random number internally to said physically and logically secure coprocessor,
   e) storing said encrypted key block external to said physically and logically secure coprocessor in unsecured storage, and
   f) erasing said software keys form storage internal to said logically and physically secure coprocessor.

42. A method of storing and retrieving a set of software keys without compromising security where said set of software keys are stored external to a physically and logically secure coprocessor element of a composite computing system, wherein said coprocessor has access to a set of supervisor keys, said method comprising the steps of:
- i) storing said software keys as recited in claim 41,
- ii) retrieving said encrypted key block and said encrypted key from said external storage,
- iii) decrypting said encrypted key with a selected one of said supervisor keys and verifying the presence of a valid message authentication code,
- iv) repeating step iii with each different supervisor key until one such step results in a valid message authentication code,
- v) decrypting said encrypted key block with that unselected portion of the result of step iv), whereby a result of said step v) is the original key block including each of said selected software keys.

43. A method of conditioning manipulation, in the form of transfer, hardware backup or erasure, of a right to execute a protected application on a composite computing system including a host processor and a physically and logically secure coprocessor, wherein said protected application includes at least a portion encrypted under a software key and said right to execute, if present, is represented by said software key along with a data object stored in a permanent memory of said coprocessor, said method comprising the steps of:
- a) providing said data object to said coprocessor,
- b) storing said software key in association with said data object in said permanent memory of said coprocessor,
- c) in response to a request for said manipulation of said software key, requiring said coprocessor to access said data object prior to any such manipulation of said software key, and
- d) thereafter requiring said coprocessor to interpret said data object as a specification of permitted manipulations and executing said manipulation if, and only if, said manipulation is a permitted manipulation.

* * * * *

UNITED STATES PATENT AND TRADEMARK OFFICE
CERTIFICATE OF CORRECTION

PATENT NO. : 5,109,413

DATED : April 28, 1992

INVENTOR(S) : Comerford et al

It is certified that error appears in the above-identified patent and that said Letters Patent is hereby corrected as shown below:

Abstract, line 10, delete "at least in terms of a valid period of execution".

Col. 1, line 17, change "n"backup"" to -backup-;

line 28, after "1986" insert -, now U.S. Patent No. 5,117,457-;

line 29, after "1986" insert -, now U.S. Patent No. 4,916,738-;

line 30, after "1986" insert -, now U.S. Patent No. 4,817,140-;

line 31, after "1986" insert -, now U.S. Patent No. 4,860,351-;

line 33, after "1986" insert -, abandoned-.

Col. 3, line 26, after "which" insert -the protected-.

Col. 19, line 42, change "ECSK($T_2$)" to -$E_{CSK}(T_2)$-;

line 54, change "user" to -using-.

Col. 21, line 16, change "system" to -systems-.

Col. 23, line 19, change "coprocessors" to -coprocessor's-.

Col. 28, line 11, change "$E_{ESKk}(RN_3 \cdot AK_3 \cdot RF)$" to -$E_{CSKk}(RN_3 \cdot AK_3 \cdot RF)$-.

Col. 29, line 38, delete "a".

Col. 31, line 24, change "encrypting" to -encrypted-.

Col. 33, line 60, change "O" to -0-;

line 62, after "said" (1st) insert -condition-.

UNITED STATES PATENT AND TRADEMARK OFFICE
CERTIFICATE OF CORRECTION

PATENT NO. : 4,109,413

DATED : April 28, 1992

INVENTOR(S) : Comerford et al

It is certified that error appears in the above-identified patent and that said Letters Patent is hereby corrected as shown below:

Col. 35, line 35, change "22" to -21-.

Col. 36, line 61, change "form" to -from-.

Col. 38, line 55, change "form" to -from-.

Col. 39, line 21, change "fist" to -first-.

Col. 40, line 4, change "e)" to -a)-;

line 63, change "form" to -from-.

Signed and Sealed this

Fourteenth Day of September, 1993

*Attest:*

BRUCE LEHMAN

*Attesting Officer*     *Commissioner of Patents and Trademarks*